United States Patent
Vasseur et al.

(10) Patent No.: US 9,800,506 B2
(45) Date of Patent: Oct. 24, 2017

(54) PREDICTIVE TIME ALLOCATION SCHEDULING FOR TSCH NETWORKS

(71) Applicant: Cisco Technology, Inc., San Jose, CA (US)

(72) Inventors: Jean-Philippe Vasseur, Saint Martin d'uriage (FR); Pascal Thubert, La Colle sur Loup (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 379 days.

(21) Appl. No.: 14/336,250

(22) Filed: Jul. 21, 2014

(65) Prior Publication Data
US 2016/0021011 A1    Jan. 21, 2016

(51) Int. Cl.
| H04L 12/801 | (2013.01) |
|---|---|
| H04L 12/825 | (2013.01) |
| H04W 72/04 | (2009.01) |
| H04W 72/12 | (2009.01) |

(52) U.S. Cl.
CPC ............ *H04L 47/127* (2013.01); *H04L 47/17* (2013.01); *H04L 47/25* (2013.01); *H04W 72/0446* (2013.01); *H04W 72/1252* (2013.01); *H04W 72/121* (2013.01)

(58) Field of Classification Search
CPC combination set(s) only.
See application file for complete search history.

(56) References Cited

U.S. PATENT DOCUMENTS

| 6,335,922 | B1 * | 1/2002 | Tiedemann, Jr. .... | H04B 7/2659 370/335 |
|---|---|---|---|---|
| 7,016,396 | B2 * | 3/2006 | Agrawal ................ | H04B 1/715 375/132 |
| 7,573,897 | B2 | 8/2009 | Elmoalem et al. | |
| 8,000,240 | B2 * | 8/2011 | DelRegno ........... | H04L 12/5695 370/232 |
| 8,638,868 | B2 * | 1/2014 | Larsson ................ | H04L 5/0032 375/260 |
| 8,761,099 | B2 * | 6/2014 | Charbit ................. | H04W 72/04 370/329 |
| 8,782,211 | B1 * | 7/2014 | Sharma ............... | H04L 67/1036 709/224 |

(Continued)

OTHER PUBLICATIONS

International Search Report dated Oct. 22, 2015 in connection with PCT/US2015/040719.

(Continued)

*Primary Examiner* — Mounir Moutaouakil
(74) *Attorney, Agent, or Firm* — Parker Ibrahim & Berg LLC; James M. Behmke; Stephen D. LeBarron

(57) ABSTRACT

In one embodiment, a device in a network receives one or more time slot usage reports regarding a use of time slots of a channel hopping schedule by nodes in the network. The device predicts a time slot demand change for a particular node based on the one or more time slot usage reports. The device identifies a time frame associated with the predicted time slot demand change. The device adjusts a time slot assignment for the particular node in the channel hopping schedule based on predicted demand change and the identified time frame associated with the predicted time slot demand change.

26 Claims, 18 Drawing Sheets

(56) References Cited

U.S. PATENT DOCUMENTS

| | | | | |
|---|---|---|---|---|
| 9,025,585 B2* | 5/2015 | Hong | ............... | H04B 7/2646 |
| | | | | 370/329 |
| 9,294,488 B2* | 3/2016 | Vasseur | ............... | H04L 63/1416 |
| 9,445,429 B2* | 9/2016 | Tabet | ............... | H04W 28/0221 |
| 9,503,466 B2* | 11/2016 | Vasseur | ............... | G06N 99/005 |
| 9,553,773 B2* | 1/2017 | Vasseur | ............... | H04L 41/142 |
| 2003/0225549 A1* | 12/2003 | Shay | ............... | H04L 41/5009 |
| | | | | 702/182 |
| 2005/0030968 A1 | 2/2005 | Rich et al. | | |
| 2008/0279155 A1 | 11/2008 | Pratt, Jr. et al. | | |
| 2010/0189074 A1 | 7/2010 | Liao | | |
| 2012/0182962 A1 | 7/2012 | Patil et al. | | |
| 2013/0294422 A1* | 11/2013 | Kikuzuki | ............... | H04W 72/1205 |
| | | | | 370/336 |

OTHER PUBLICATIONS

Dujovne et al. "6TiSCH On-the-Fly Scheduling draft-dujovne-6tisch-on-the-fly-02", Feb. 14, 2014, pp. 1-10.
Thubert et al. "An Architecture for IPv6 over the TSCH mode of IEEE 802.15.4e draft-ietf-6tisch-architecture-03" Jul. 4, 2014, pp. 1-30.
Vilajosana et al. "Minimal 6TiSCH Configuration draft-ietf-6tisch-minimal-02", Jul. 4, 2014, pp. 1-20.
Palattella et al. "Terminology in IPv6 over the TSCH mode of IEEE 802.15.4e draft-ietf-6tisch-terminology-02", Jul. 4, 2014, pp. 1-12.
Watteyne et al. "Using IEEE802.15.4e TSCH in an LLN context: Overview, Problem Statement and Goals draft-ietf-6tisch-tsch-01", Jul. 4, 2014, pp. 1-22.

* cited by examiner

PREDICTIVE TIME ALLOCATION SCHEDULING FOR TSCH NETWORKS

TECHNICAL FIELD

The present disclosure relates generally to computer networks, and, more particularly, to predictive time allocation scheduling for time slotted channel hopping (TSCH) networks.

BACKGROUND

In general, deterministic networking attempts to precisely control when a data packet arrives at its destination (e.g., within a bounded timeframe). This category of networking may be used for a myriad of applications such as industrial automation, vehicle control systems, and other systems that require the precise delivery of control commands to a controlled device. However, implementing deterministic networking also places additional requirements on a network. For example, packet delivery in a deterministic network may require the network to exhibit fixed latency, zero or near-zero jitter, and high packet delivery ratios.

As an example of a deterministic network, consider a railway system. A railway system can be seen as deterministic because trains are scheduled to leave a railway station at certain times, to traverse any number stations along a track at very precise times, and to arrive at a destination station at an expected time. From the human perspective, this is also done with virtually no jitter. Which tracks are used by the different trains may also be selected so as to prevent collisions and to avoid one train from blocking the path of another train and delaying the blocked train.

Low power and lossy networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. Changing environmental conditions may also affect device communications in an LLN. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
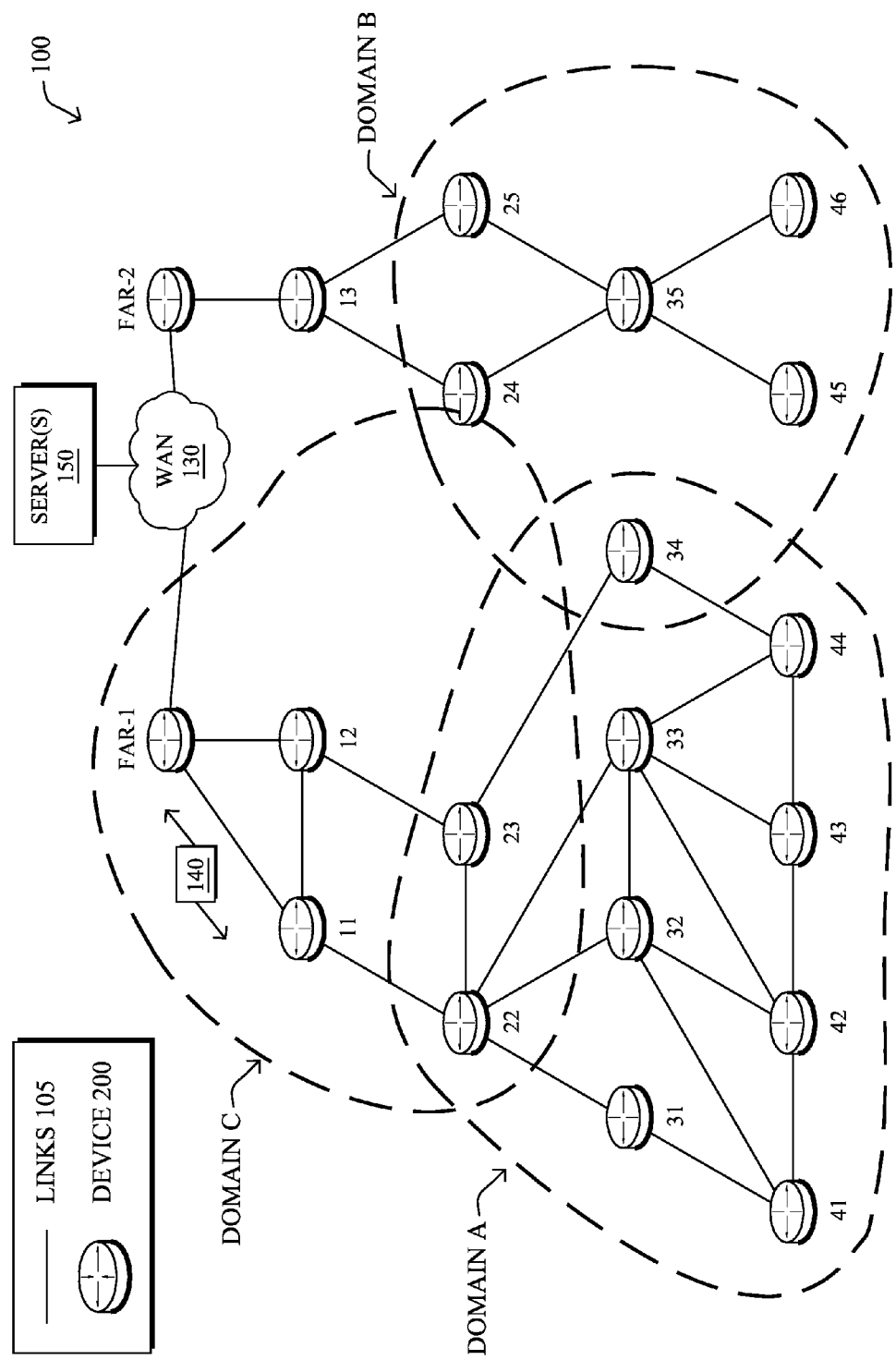
FIG. 1 illustrates an example communication network.

According to one or more embodiments of the disclosure, a network node provides one or more time slot usage reports to a time slot usage prediction engine regarding a use of time slots of a channel hopping schedule by one or more child nodes of the network node. The network node receives a predicted time slot usage change for the one or more child nodes. The network node generates one or more updated time slot assignments for the one or more child nodes based on the predicted time slot usage change. The network node provides the one or more updated time slot assignments to the one or more child nodes.

In further embodiments, a device in a network receives one or more time slot usage reports regarding a use of time slots of a channel hopping schedule by nodes in the network. The device predicts a time slot demand change for a particular node based on the one or more time slot usage reports. The device identifies a time frame associated with the predicted time slot demand change. The device adjusts a time slot assignment for the particular node in the channel hopping schedule based on predicted demand change and the identified time frame associated with the predicted time slot demand change.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "FAR-1," "FAR-2," and "11," "12," . . . "46," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while network 100 is shown in a certain orientation, particularly with a field area router (FAR) node, the network 100 is merely an example illustration that is not meant to limit the disclosure. Also as shown, a particular FAR (e.g., FAR-1) may communicate via a WAN 130 with any number of servers 150, such as a path computation element (PCE), network management service (NMS), or other supervisory device.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other. One communication technique that may be used to implement links 105 is channel-hopping. Also known as frequency hopping, use of such a technique generally entails wireless devices "hopping" (e.g., alternating) between different transmission and reception frequencies according to a known schedule. Network 100 may also be divided into any number of wireless domains (e.g., domains A-C) in which nodes 200 may communicate.

Figure 2:
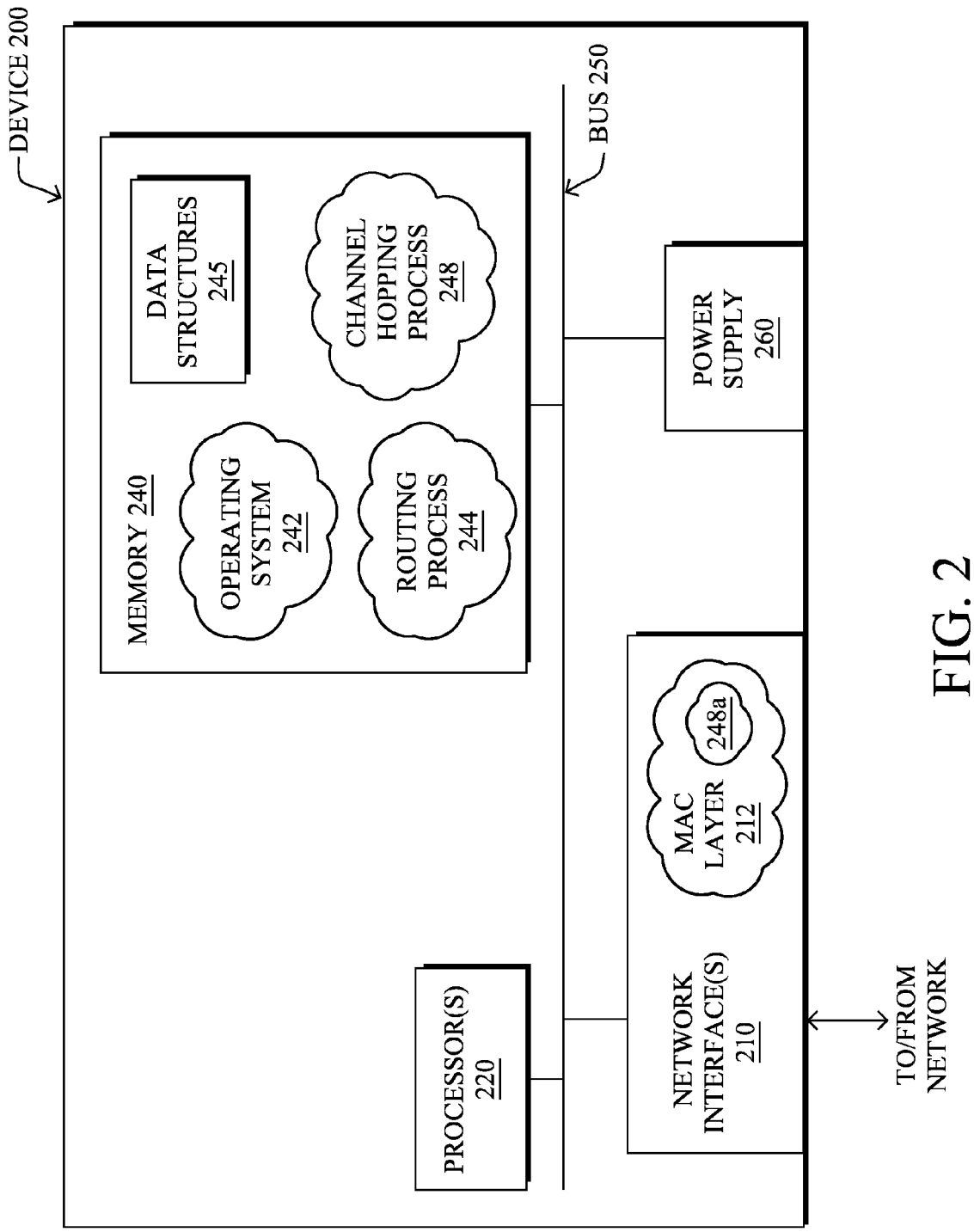
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210, e.g., transceivers, include the mechanical, electrical, and signaling circuitry for communicating data over links 105 coupled to the network 100. The network interfaces may be configured to transmit and/or receive data using a variety of different communication protocols, particularly for frequency-hopping communication as described herein. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 includes a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may include hardware elements or hardware logic configured to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may include routing process/services 244, and an illustrative channel hopping process 248 as described in greater detail below. Note that while channel hopping process 248 is shown in centralized memory 240, alternative embodiments provide for the process to be specifically operated within the network interfaces 210, such as within a MAC layer 212 (as "process 248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc.

Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

According to various embodiments, routing process 244 and/or channel hopping process 248/248a may utilize machine learning techniques, to predict a future state of the network (e.g., predict routing changes, predict time slot usage by nodes, etc.). In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes such that $M=a^*x+b^*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more machine learning processes for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Artificial Neural Networks (ANNs) are a type of machine learning technique whose underlying mathematical models that were developed inspired by the hypothesis that mental activity consists primarily of electrochemical activity between interconnected neurons. ANNs are sets of computational units (neurons) connected by directed weighted links. By combining the operations performed by neurons and the weights applied by, ANNs are able to perform highly non-linear operations to input data. The interesting aspect of ANNs, though, is not that they can produce highly non-linear outputs of the input, but that they can learn to reproduce a predefined behavior through a training process. Accordingly, an ANN may be trained to identify deviations in the behavior of a network that could indicate the presence of a network attack (e.g., a change in packet losses, link delays, number of requests, etc.).

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by routing process 244) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012). Further, an example OF (e.g., a default OF) may be found in an IETF RFC, entitled "RPL Objective Function 0"<RFC 6552> by Thubert (March 2012) and "The Minimum Rank Objective Function with Hysteresis"<RFC 6719> by O. Gnawali et al. (September 2012).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
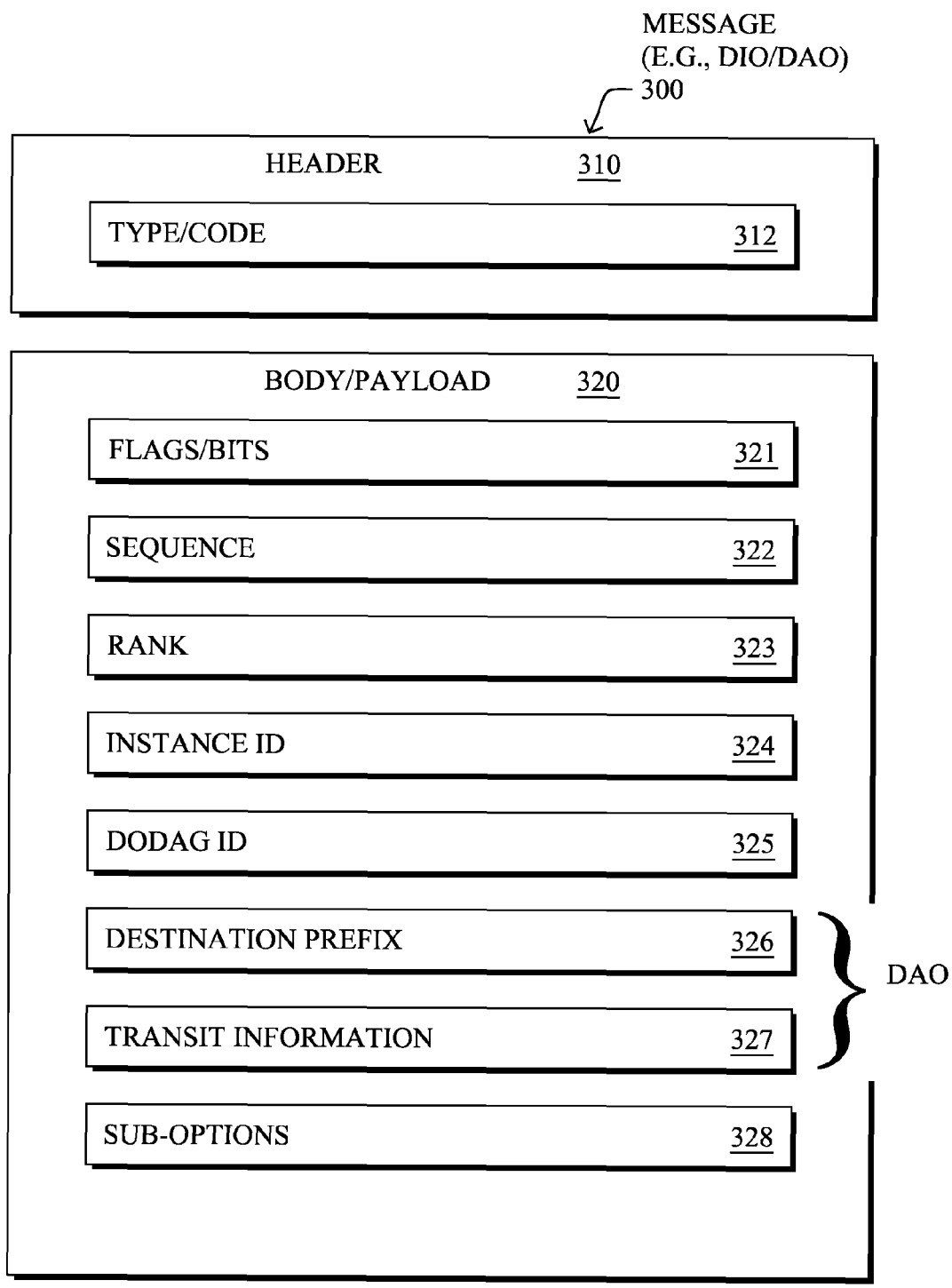
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
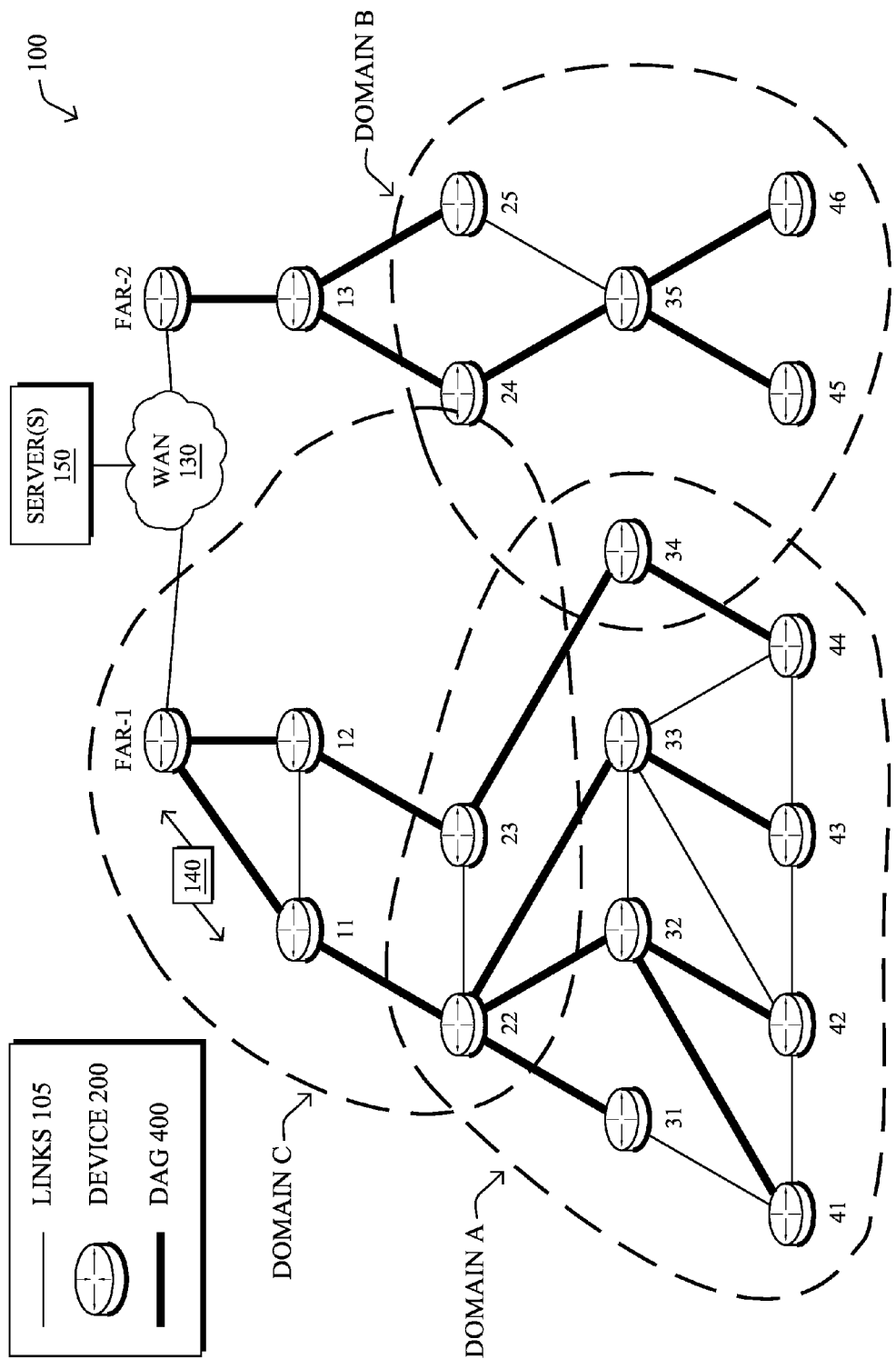
FIG. 4 illustrates an example directed acyclic graph (DAG) in the communication network of FIG. 1.

FIG. 4 illustrates an example simplified DAG 400 that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 400 (shown as bolded lines), which extends from the root node toward one or more leaf nodes (nodes without children). Traffic/packets 140 (shown in FIG. 1) may then traverse the DAG 400 in either the upward direction toward the root or downward toward the leaf nodes, particularly as described herein.

According to various embodiments, communications within network 100 may be deterministic. Notably, low power wireless industrial process control typically uses 1 Hz to 4 Hz control loops, and for those, a scheduled MAC protocol can be considered deterministic, even when clocks drift in the order of tens of parts per million (ppm). A low-throughput technology such as IEEE802.15.4 may thus be adapted to support determinism. In particular, the bandwidth can be pre-formatted in a time division multiplexing (TDM) fashion using IEEE802.15.4, and time slots become a unit of throughput that can allocated to a deterministic flow, without incurring a huge consumption of system resources. In other implementations of a time sensitive network, individual timers may be used by the networked devices instead of TDM. Such timers may elapse at the time of a deterministic transmission, so as to reserve the medium for that transmission, leaving the medium free for best effort routing the rest of the time.

Routing in a deterministic network can be operated either in a centralized or in a distributed fashion, but only the centralized routing operation can guarantee the overall optimization for all the flows with a given set of constraints and goals. An example architecture to support such a technique may be found in the IETF draft entitled "An Architecture for IPv6 over the TSCH mode of IEEE 802.15.4e" by Thubert et al. (February 2014), and referred to herein as "6TiSCH". The centralized computation is typically done by a PCE with an objective function that represents the goals and constraints. A PCE may compute not only an optimized Layer 3 path for purposes of traffic engineering, but also to compute time slots associated with a deterministic flow at the same time as it computes a route over an LLN. Generally speaking, this requires the PCE to have knowledge of the flows as well as knowledge of the radio behavior at each hop (e.g., an estimation of the expected transmission count (ETX) so as to provision enough time slots for retransmissions).

For distributed routing, 6TiSCH relies on the RPL routing protocol (RFC6550). The design of RPL also includes the capability to build routing topologies (e.g., "instances" in RPL parlance) that are associated with objective functions, but in a distributed fashion. With RPL, the routing operations will be more efficient (e.g., with no need of CPU intensive PCE computations) and resilient (e.g., with no dependence on a PCE for base routing and recovery).

Of note is that scheduling is not a part of RPL and may be designed for the distributed routing scheme. Although it is not possible to guarantee that an individual path is fully optimized, or that the distribution of resources is globally optimized, it may be possible to impose deterministic behavior along a routing path (e.g., an ultra-low jitter, controlled latency, etc.).

For the underlying MAC operation, 6TiSCH relies, as its name shows, on time slotted channel hopping (TSCH). More specifically, 6TiSCH is being designed for the IEEE802.15.4e TSCH mode of operation. This is the standardized version of the MAC that was adopted by all industrial WSN standards, ISA100.11a, WirelessHART and WIAPA.

The time slotted aspect of the TSCH technology is a time division multiplexing (TDM) technique, which requires all nodes in the network to be time synchronized. In other words, time is sliced up into time slots with a given time slot being long enough for a MAC frame of maximum size to be sent from mote B to node A, and for node A to reply with an acknowledgment (ACK) frame indicating successful reception.

TSCH is different from traditional low-power MAC protocols because of its scheduled nature. In TSCH, all nodes in the network follow a common communication schedule, which indicates for each active (e.g., transmit or receive) timeslot a channel offset and the address of the neighbor to communicate with. The channel offset is translated into a frequency using a specific translation function which causes pairs of neighbors to "hop" between the different available channels (e.g., frequencies) when communicating. Such channel hopping technique efficiently combats multi-path fading and external interference. Notably, since 6TiSCH is based on TSCH, 6TiSCH also uses the basic TSCH concepts of a schedule and time slots. However, since 6TiSCH may extend over several interference domains with distributed routing and scheduling, there is no longer the concept of a single schedule that would centralize all the transmissions and receptions. In particular, with 6TiSCH, some TSCH concepts may still apply globally and their configurations must be shared by all nodes in the network, but other concepts may be local to a given node in 6TiSCH. For example, the hopping schedule in 6TiSCH may represent only the transmission to which a particular node is participating.

Figure 5:
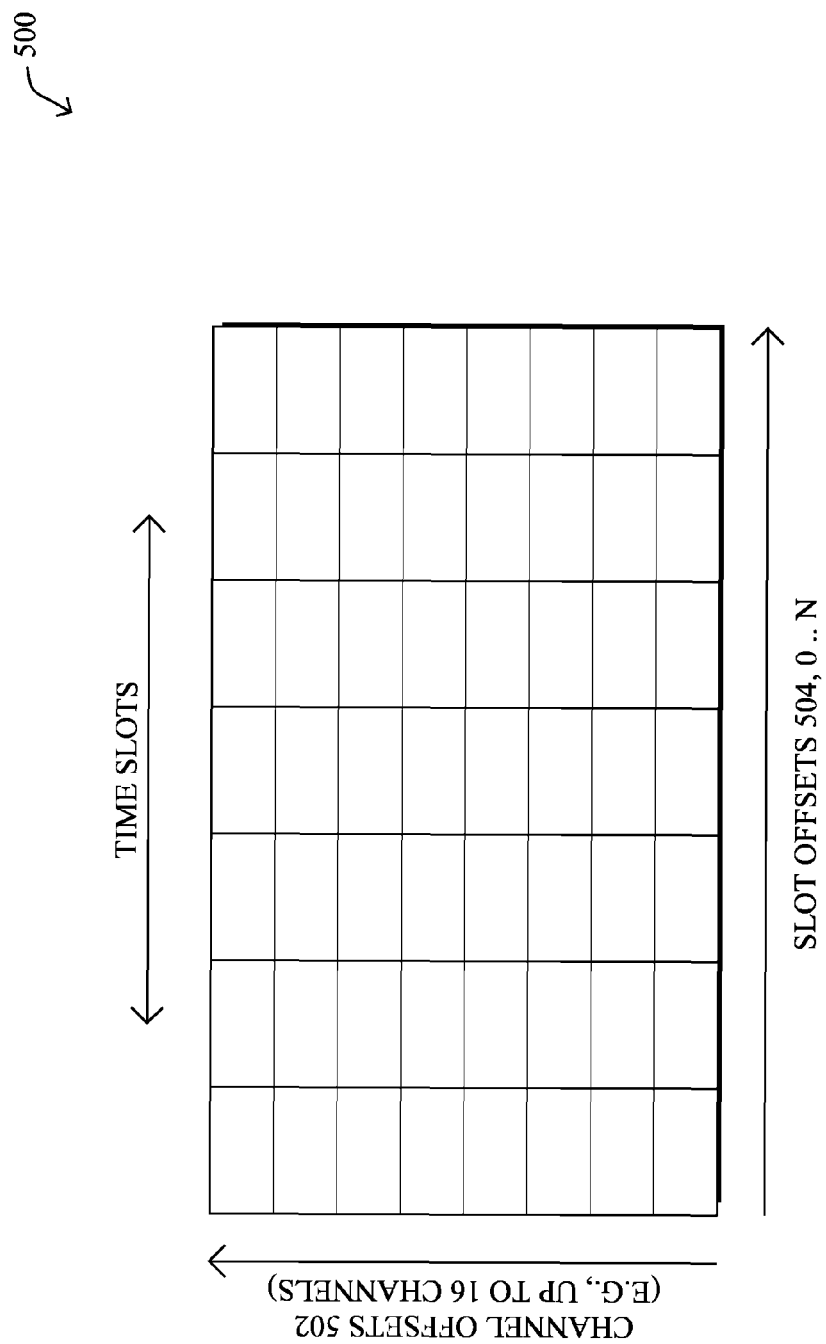
FIG. 5 illustrates an example channel distribution/usage (CDU) matrix.

Referring now to FIG. 5, an example channel distribution/usage (CDU) matrix 500 is shown that may be used by the nodes/devices 200 in network 100. Notably, 6TiSCH defines a new global concept of a CDU matrix that may repeat itself over time and represents the global characteristics of the network such as used/unused channels, timeslot durations, number of time slots per iteration, etc. As shown, CDU matrix 500 may include an index of channel offsets 502 along a first axis that correspond to the channels available for use in network 100 (e.g., offsets for each of sixteen available channels). As would be appreciated, any number of channels may be used in the network. Along the other axis are slot offsets 504 that correspond to differing time slots, the combination of which is equal to one period of the network scheduling operation.

CDU matrix 500 may be used to define the basic wireless communication operations for the network. For example, CDU matrix 500 may be used to define the duration of a timeslot (e.g., between 10 to 15 ms), the period of an iteration (e.g., the total number of time slots, indexed by slot offsets 504), and the number of channels (e.g., indexed by channel offset 502) to which the MAC may jump.

A "cell" in CDU matrix 500 is defined by the pair (slot offset, channel offset) in the epochal description of CDU matrix 500, in other words, at time t=0. During runtime, the actual channel at which a given transmission happens may be rotated to avoid interferences such as self-inflicted multipath fading.

Figure 6:
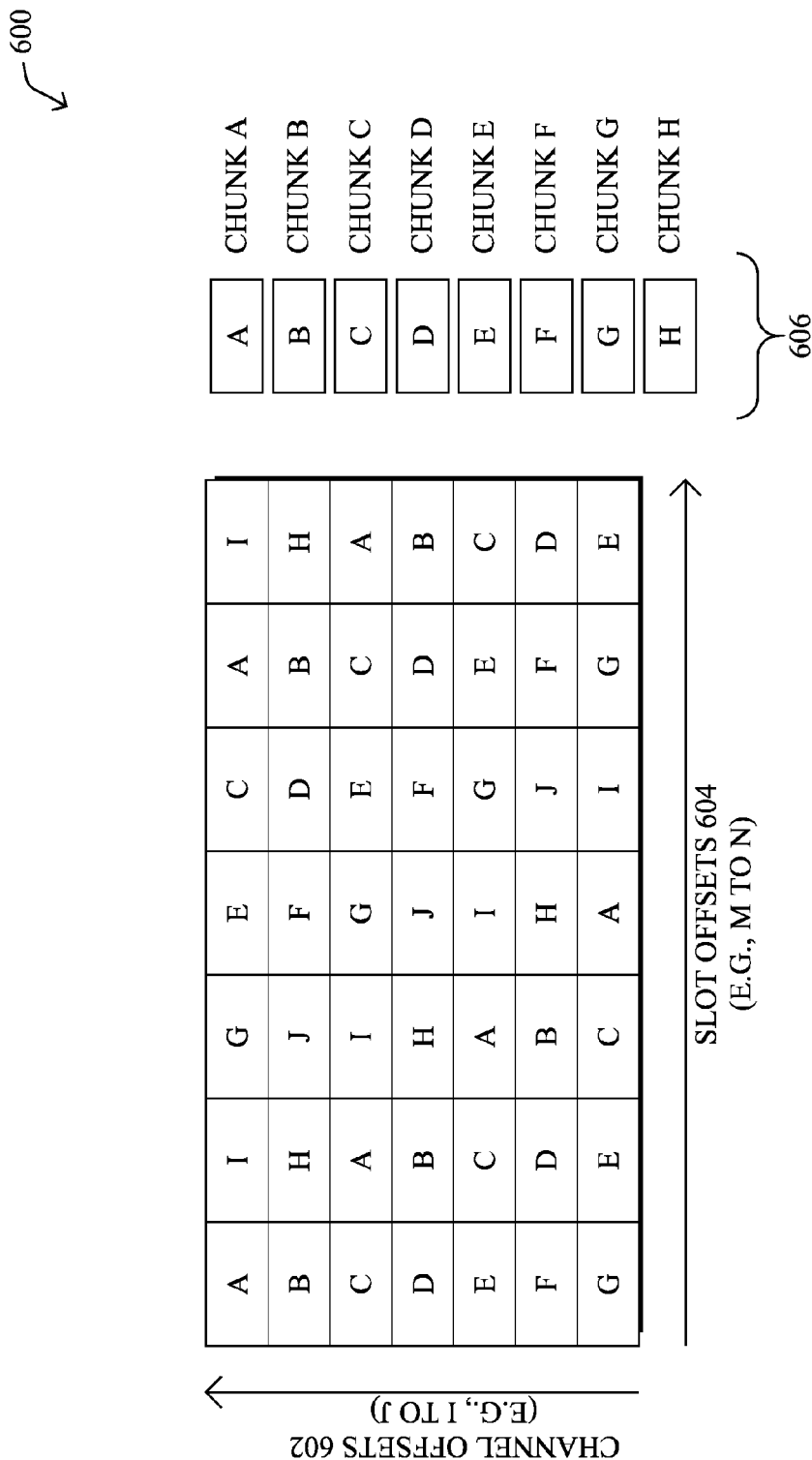
FIG. 6 illustrates example chunks of the CDU matrix of FIG. 5.

Referring now to FIG. 6, an example subset 600 of CDU matrix 500 is shown to be divided into chunks 606. In order to scale the network, the computation of the channel hopping schedule for the network may be distributed. According to some embodiments, such as those in which 6TiSCH is used, a parent node (e.g., an RPL parent) may be responsible for computing the schedule between the parent and its child node(s) in both directions. In order to allocate a cell for a given transmission, the parent node must be certain that this cell will not be used by another parent in the interference domain. As shown, for example, cells within CDU matrix 500 may be "owned" by different parent nodes within the network. The collective cells of CDU matrix 500 assigned to different parent nodes may then be grouped together as chunks 606. In one implementation, for example, CDU matrix 500 may be formatted into chunks by making a full partition of matrix 500. The resulting partition must be well known by all the nodes in the network, to support the appropriation process, which would rely on a negotiation between nodes within an interference domain.

Typically, there will be at most one cell in a chunk per column of CDU matrix 500, to reflect that a device with a single radio may not use two channels at the same time. The cells may also be well distributed in time and frequency, so as to limit the gaps between transmissions and avoid the sequential loss of frames in multipath fading due to the consecutive reuse of a same channel.

Chunks 606 may be defined at the epochal time (e.g., at the time of creation of CDU matrix 500) and the 802.15.4e operation may be repeated iteratively any number of times. Typically, the effective channel for a given transmission may be incremented by a constant that is prime with the number of channels, modulo the number of channels at each iteration. As a result, the channel of a given transmission changes at each iteration and the matrix virtually rotates.

Figure 7:
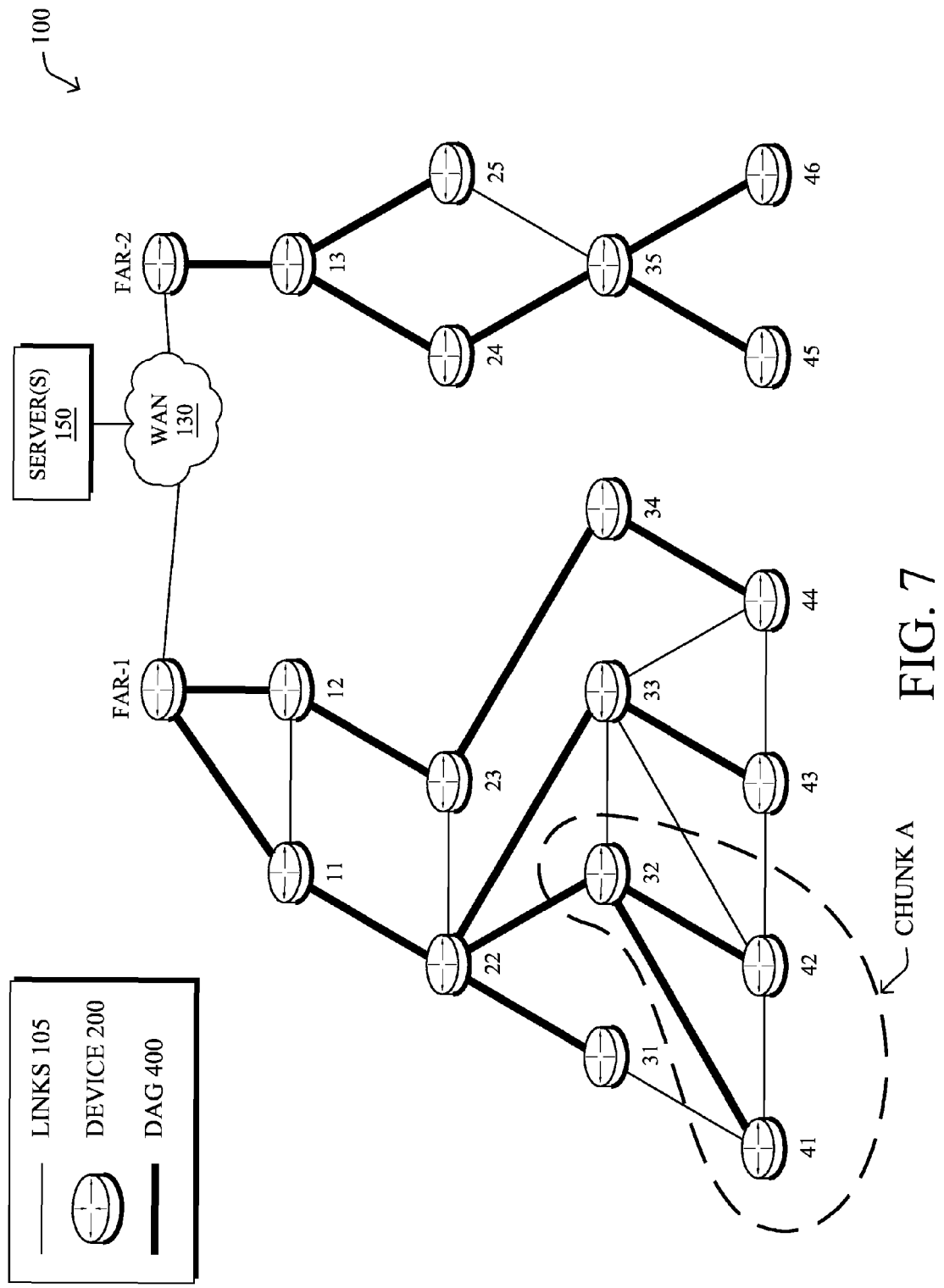
FIGS. 7-8 illustrate examples of a parent node in the network of FIG. 1 scheduling communications for a particular chunk.
Figure 8:
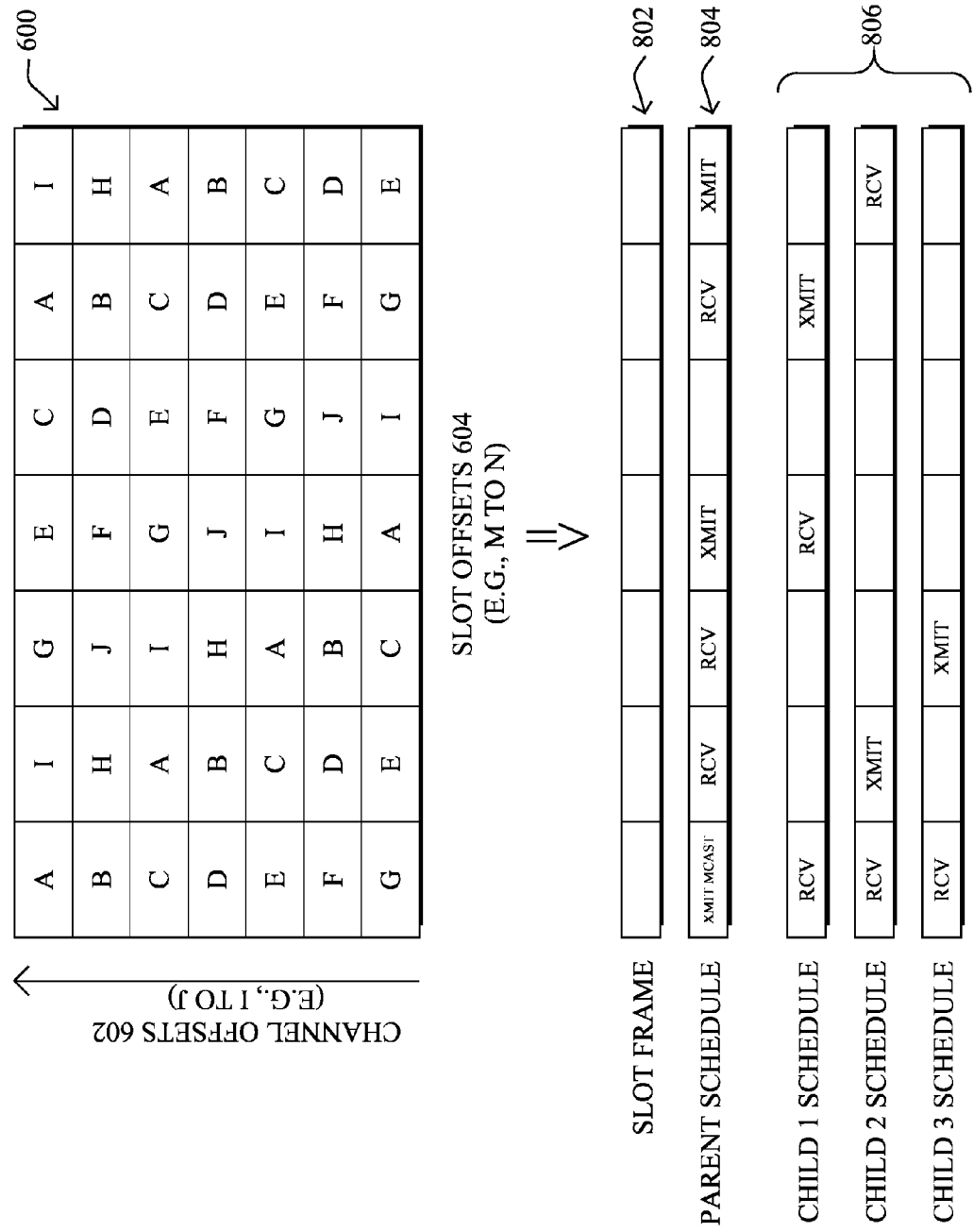

FIGS. 7-8 illustrate examples of a parent node in the network of FIG. 1 scheduling communications for a particular chunk. As shown, assume that node 32 is the parent node of child nodes 41, 42 according to the routing protocol. Node 32 may be assigned a chunk (e.g., chunk A) of CDU matrix 500, thereby allowing node 32 to manage the usage of the corresponding cells in the chunk within its interference domain. Thus, node 32 may decide which transmissions will occur over the cells in the chunk between itself and its child node(s). Ultimately, a chunk represents some amount of bandwidth and can be seen as the generalization in the time/frequency domain of the classical channel that is used to paint a wireless connectivity graph, e.g. to distribute TV frequencies over a country or WiFi channels in an ESS deployment.

If chunks are designed to form a partition of the CDU matrix 500, multiple different chunks may be in use in the same area of network 100 and under the control of different parents. In one embodiment, the appropriation process may be such that any given node that communicates using cells in a given chunk, as appropriated and managed by a parent A, should not be within the interference domain of any other node that is also communicating using the same chunk but appropriated and managed by a different parent B. Consequently, the number of parents in any given area of the network may be constrained by the number of chunks.

Referring more specifically to FIG. 8, parent node 32 may use a slot frame 802 to assign hopping schedules 804, 806 to itself and any of its child node(s), respectively. Generally speaking, slot frame 802 is a MAC-level abstraction that is also internal to the node and includes a series of time slots of equal length and priority. For example, the size of the slot frame 802 may match the CDU matrix 500. Parent node 32 may use slot frame 802 to divide the corresponding times into slots and associate the slots to a particular operation (e.g., reception, transmission, multicast operation, etc.). For example, as shown, parent node 32 and one of its child nodes may be synchronized to use the same channel during a given time slot.

Slot frame 802 may be characterized by a slotframe_ID, a slot duration, and a slotframe_size. In some implementations, multiple slot frames may coexist in a node's schedule. In other words, a node can have multiple activities scheduled in different slot frames, based on the priority of its packets/traffic flows. The different slot frames may be implemented as having the same durations/sizes or different durations/sizes, in various cases. The time slots in the slot frame may also be indexed by the slot offsets 604 (e.g., the first time slot in slot frame 802 may be indexed as slot offset 0, etc.).

In various implementations, different parent nodes may appropriate different chunks such that the chunks used throughout the network do not interfere. For example, chunks may be appropriated by different parent nodes such that, for a given chunk, the domains do not intersect. In addition, the domains for different chunks are generally not congruent since the chunks are owned by different nodes. As a result, the schedule in a node with a single radio is a series of transmissions, and the parent to child cells are taken from (one of) the chunk(s) that the parent has appropriated.

6TiSCH also defines the peer-wise concept of a "bundle," that is needed for the communication between adjacent nodes. In general, a bundle is a group of equivalent scheduled cells (e.g., cells identified by different slot offset/channel offset pairs), which are scheduled for a same purpose, with the same neighbor, with the same flags, and the same slot frame. The size of the bundle refers to the number of cells it includes. Given the length of the slot frame, the size of the bundle also translates directly into bandwidth, either logical or physical. Ultimately a bundle represents a half-duplex link between nodes, one transmitter and one or more receivers, with a bandwidth that amount to the sum of the time slots in the bundle. Adding a timeslot in a bundle increases the bandwidth of the link.

Track forwarding is the simplest and fastest forwarding model defined in the 6TiSCH architecture that specifies IPv6 over TSCH. In general, a "track" is defined as an end-to-end succession of time slots, with a particular timeslot belonging to at most one track. In this model, a set of input cells (time slots) are uniquely bound to a set of output cells, representing a forwarding state that can be used regardless of the upper layer protocol. This model can effectively be seen as a G-MPLS operation in that the information used to switch is not an explicit label, but rather related to other properties of the way the packet was received, a particular cell in the case of 6TiSCH. As a result, as long as the TSCH MAC (and Layer 2 security) accepts a frame, that frame can be switched regardless of the protocol, whether this is an IPv6 packet, a 6LoWPAN fragment, or a frame from an alternate protocol such as WirelessHART of ISA100.11a.

For a given iteration of a slotframe, the timeslot is associated uniquely with a cell, which indicates the channel at which the timeslot operates for that iteration. A data frame that is forwarded along a track has a destination MAC address set to broadcast or a multicast address depending on MAC support. This way, the MAC layer in the intermediate nodes accepts the incoming frame and the 6 top sublayer switches it without incurring a change in the MAC header. In the case of IEEE802.15.4e, this means effectively broadcast, so that along the Track the short address for the destination is set to broadcast, 0xFFFF. Conversely, a frame that is received along a track with a destination MAC address set to this node is extracted from the track stream and delivered to the upper layer. A frame with an unrecognized MAC address may be ignored at the MAC layer and thus is not received at the 6 top sublayer.

As noted above, scheduling communications in a deterministic network may be difficult, particularly when the network is scalable. Notably, centralized computation of time schedules by a network device (e.g., a PCE, etc.) may require a priori knowledge of the traffic demands between all nodes in the networks. Although on-the-fly real time traffic reporting may be implemented in a network, the additional bandwidth requirements to do so may be unsuitable for many situations. For example, while typically not a fundamental issue in high-bandwidth network such as IP/MPLS networks, sending such communications to a PCE may present a significant issue for scaling a TSCH network. In particular, if the presence of a super-flow is detected in the network, a node may trigger a request to the PCE. In response, the PCE may re-compute time schedules for a potentially large number of existing flows (which is known as an NP-Complete problem), before sending back the new schedules. In a constrained network such as an LLN, the resulting control plane and response time may be unacceptable for many applications. Additionally, if certain nodes are battery operated, the additional traffic associated with the real time reporting may directly impinge the life expectancy of the network devices.

Predictive Time Allocation Scheduling for TSCH Networks

The techniques herein provide a machine learning-based architecture that may make time slot allocation changes based on predicted traffic changes. In some aspects, information regarding actual traffic and time slot usage by the network nodes may be used to adjust time slot allocations (e.g., allocated cells of a CDU matrix) in relation to a predicted burst of traffic. The machine learning model may, in some cases, be hosted on a centralized network device (e.g., a PCE, etc.) and receive time slot usage reports on a per-child-basis, along with other network statistics, such as the queuing delays. In one embodiment, predictions of traffic changes and/or their seasonality may be made using background processing instead of being explicitly requested by nodes in the network. In turn, the PCE may trigger the dynamic allocation or removal of time slots from the nodes or provide in advance the computed time frames according to its own prediction.

Specifically, according to one or more embodiments of the disclosure as described in detail below, a device in a network receives one or more time slot usage reports regarding a use of time slots of a channel hopping schedule by nodes in the network. The device predicts a time slot demand change for a particular node based on the one or more time slot usage reports. The device identifies a time frame associated with the predicted time slot demand change. The device adjusts a time slot assignment for the particular node in the channel hopping schedule based on predicted demand change and the identified time frame associated with the predicted time slot demand change.

Illustratively, the techniques described herein may be performed by hardware, software, and/or firmware, such as in accordance with the channel hopping process 248/248a, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols (e.g., IEEE 802.15.4e 6TiSCH, etc.), and as such, may be processed by similar components understood in the art that execute those protocols, accordingly.

Operationally, a predictive approach may be taken by a centralized networking device (e.g., a PCE, etc.), to perform time scheduling that takes into account predicted traffic changes and/or any associated seasonality of the traffic changes. As used herein, the centralized device may be referred to as a Predictive Time Scheduler (PTS) PCE (e.g., a prediction engine). In contrast to a PCE that allocates time slots according to a priori knowledge of the traffic flows or in response to an explicit request (e.g., from the nodes, from an NMS, etc.), a PTS may make base time slot allocations on network conditions predicted by a machine learning model. Example models may include, but are not limited to, auto-regressive moving average (ARMA) models, ARMA-X models that take into account exogenous variables (X), Hidden Markov Models (HMMs), Gaussian Processes, or any other machine learning model that can be used to predict traffic demand changes and/or the seasonality of such changes. Although described primarily using the example of adding more time slots to a node, the techniques herein may be applied in a similar manner to remove time slots from a node, if its traffic is predicted to decrease.

In some embodiments, each node may be configured to provide compressed information regarding use of its allocated time slots within a time slot usage report. As noted previously, each parent node may receive or send packets between itself and a child node according to a given routing topology (e.g., a DODAG computed by a distributed routing protocol such as RPL), with one packet and acknowledgement per time slot.

Figure 9A:
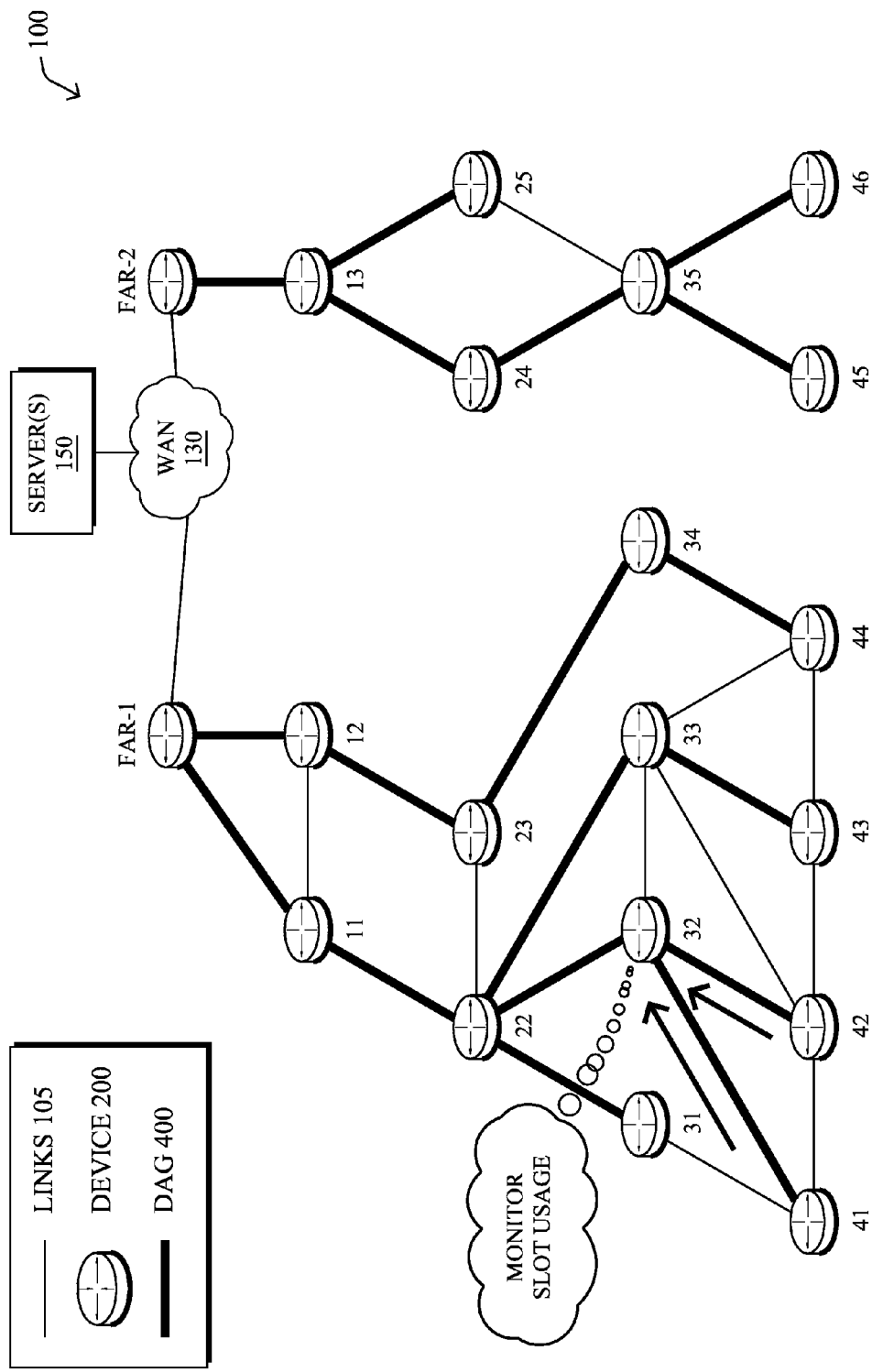
FIGS. 9A-9C illustrate examples of time slot usages reports being generated.
Figure 9B:
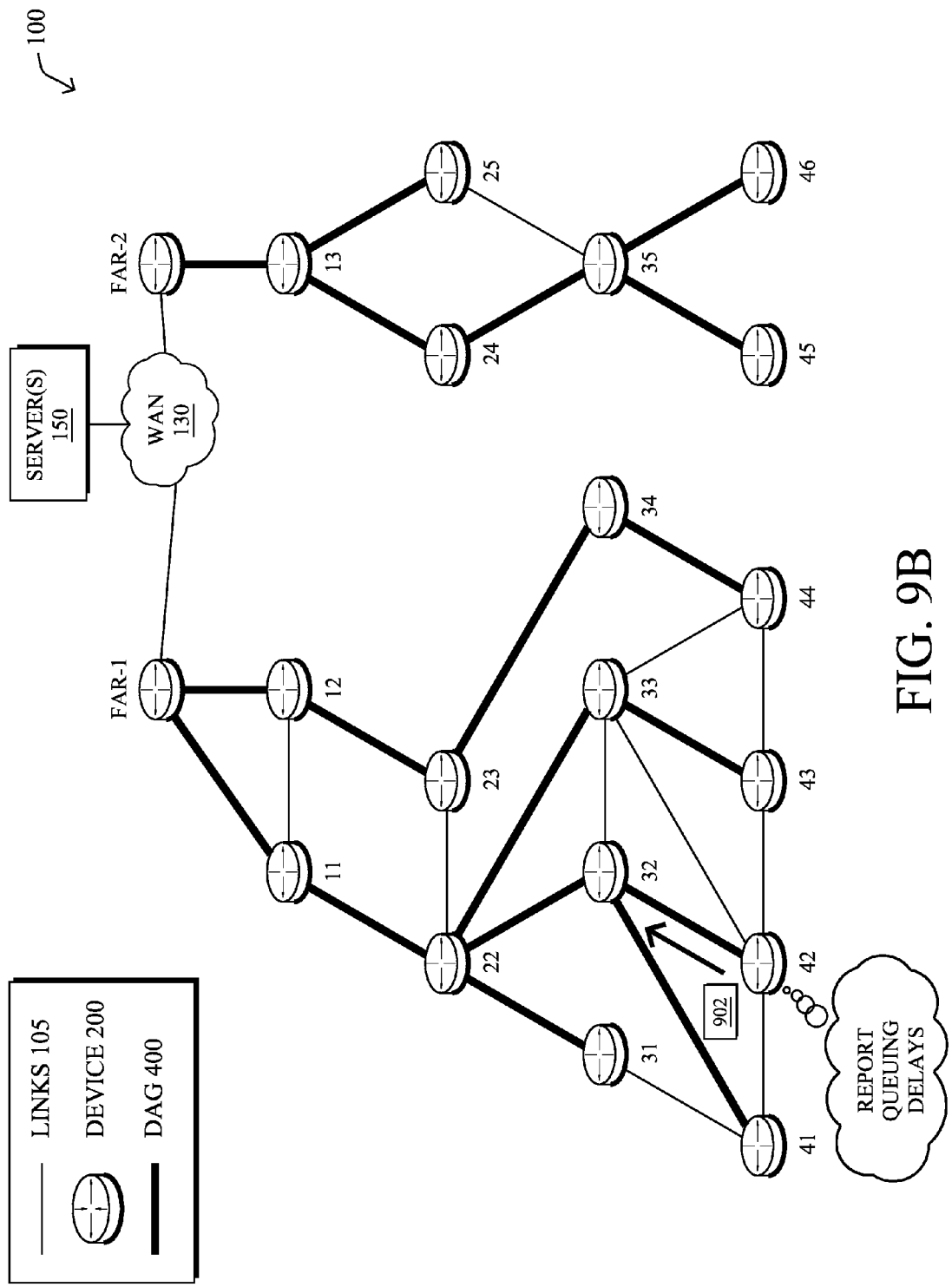
Figure 9C:
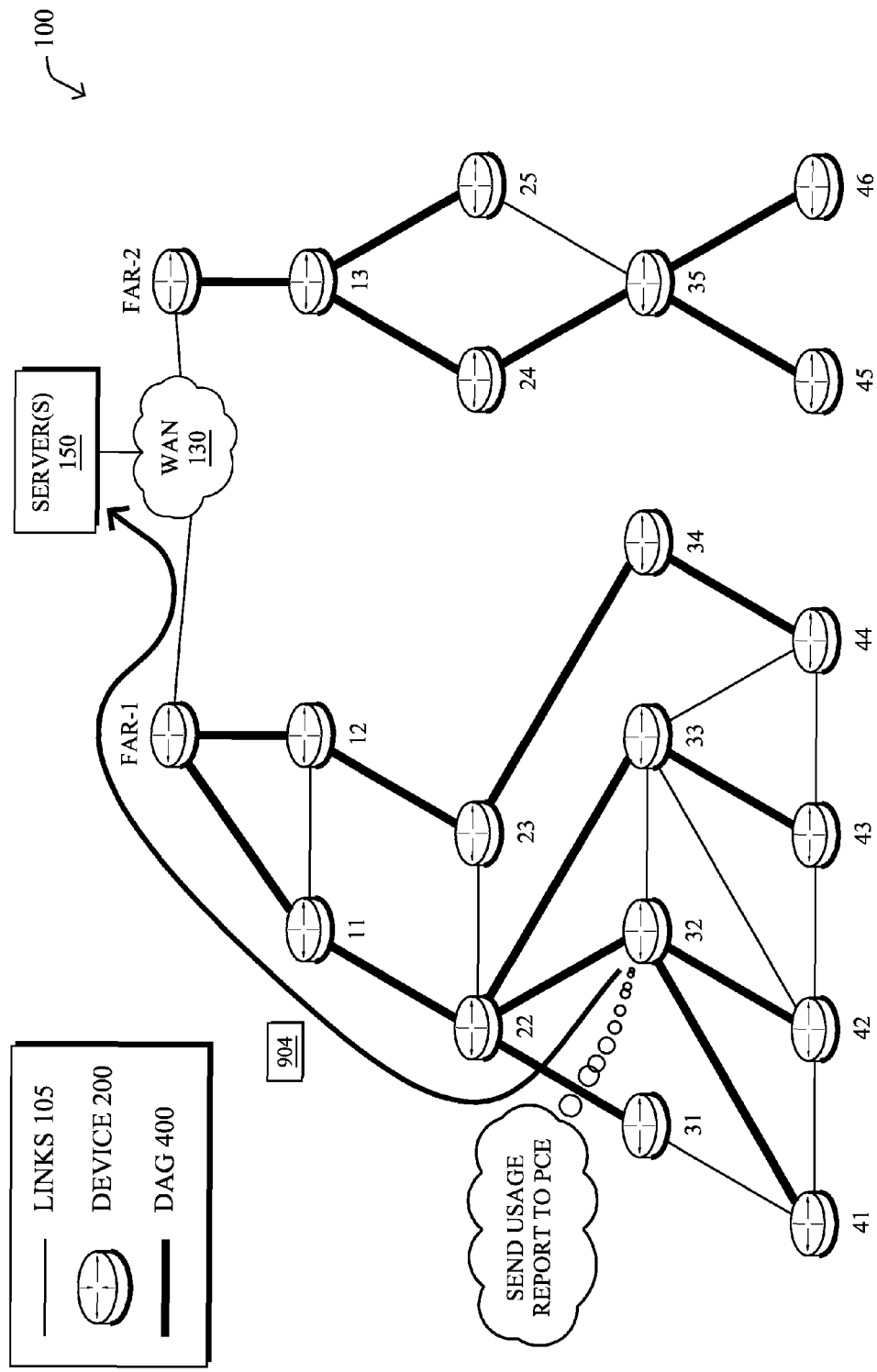

Referring now to FIGS. 9A-9C, examples are shown of time slot usages reports being generated. For example, as shown in FIG. 9A, parent node 32 may monitor the use of the time slots allocated to its child nodes 41 and 42. Based on the traffic send during the allocated time slots between parent node 32 and child nodes 41 and 42, parent node 32 may then generate a time slot usage report that quantifies how heavily the nodes use the time slots.

In some cases, a time slot usage report may also include information regarding queuing delays experienced by a child node and/or alternative paths used by the child node (e.g., due to a time slot with its preferred parent being unavailable). For example, as shown in FIG. 9B, child node 42 may send a message 902 to its parent node 32 that provides feedback regarding any queuing delays experienced by node

42. In particular, if node 42 is running out of allocated time slots to send traffic to its parent node 32, node 42 may queue the traffic until its next available time slot, thereby delaying the traffic. Since node 32 is otherwise unaware of the queuing delay experienced by the user traffic from its children nodes 41 and 42, notification message 902 may be sent to parent node 32, to report on any experienced queuing delays. In some cases, a reported delay may also include information regarding a priority associated with the delayed traffic.

In some embodiments, message 902 may be a custom IPv6 link local message or a custom type-length-value (TLV) piggybacked using the routing protocol. For example, if the routing protocol in use is RPL in storing mode, message 902 may be a DAO message that includes queuing delay information within a TLV, which may be consumed by the route storing parent node 32. In another embodiment, message 902 may be piggybacked with a data frame as an IEEE 802.15.4e Information Element (IE). In response to receiving message 902, the parent node 32 may include any delay-related information from message 902 in a time slot usage report. Notably, such information may be used by the prediction engine in its predictions. For example, if the machine learning model used by the prediction engine detects increased delays from node 42 to its parent node 32, this may be used by the prediction engine to detect an increase in traffic. Detecting a time-based pattern in increased delays may also be treated by the prediction engine as a sign of seasonality and used by the prediction engine to allocate more time slots for the affected nodes at the specific period of time.

As shown in FIG. 9C, node 32 may provide a time slot usage report 904 to the prediction engine (e.g., a PCE 150). In one embodiment, each node sends after the expiration of a timer T, a time slot usage report to the PTS that contains a bit map of the set of time slots that were effectively used by each of its children. In another embodiment, the report can be sent if the node determines that the proportion of time slots effectively being used has changed significantly. In yet another embodiment, the periodic timer T may be dynamically computed by the PTS according to the prediction accuracy of the computed predictive model. For example, if the PTS determines that the time slot usage matches its prediction, it may increase the periodic timer T, to extend the periodicity of the usage reports. Conversely, the timer T may be reduced to increase the frequency of the reports, should the resulting predictions prove to be inaccurate.

Figure 10A:
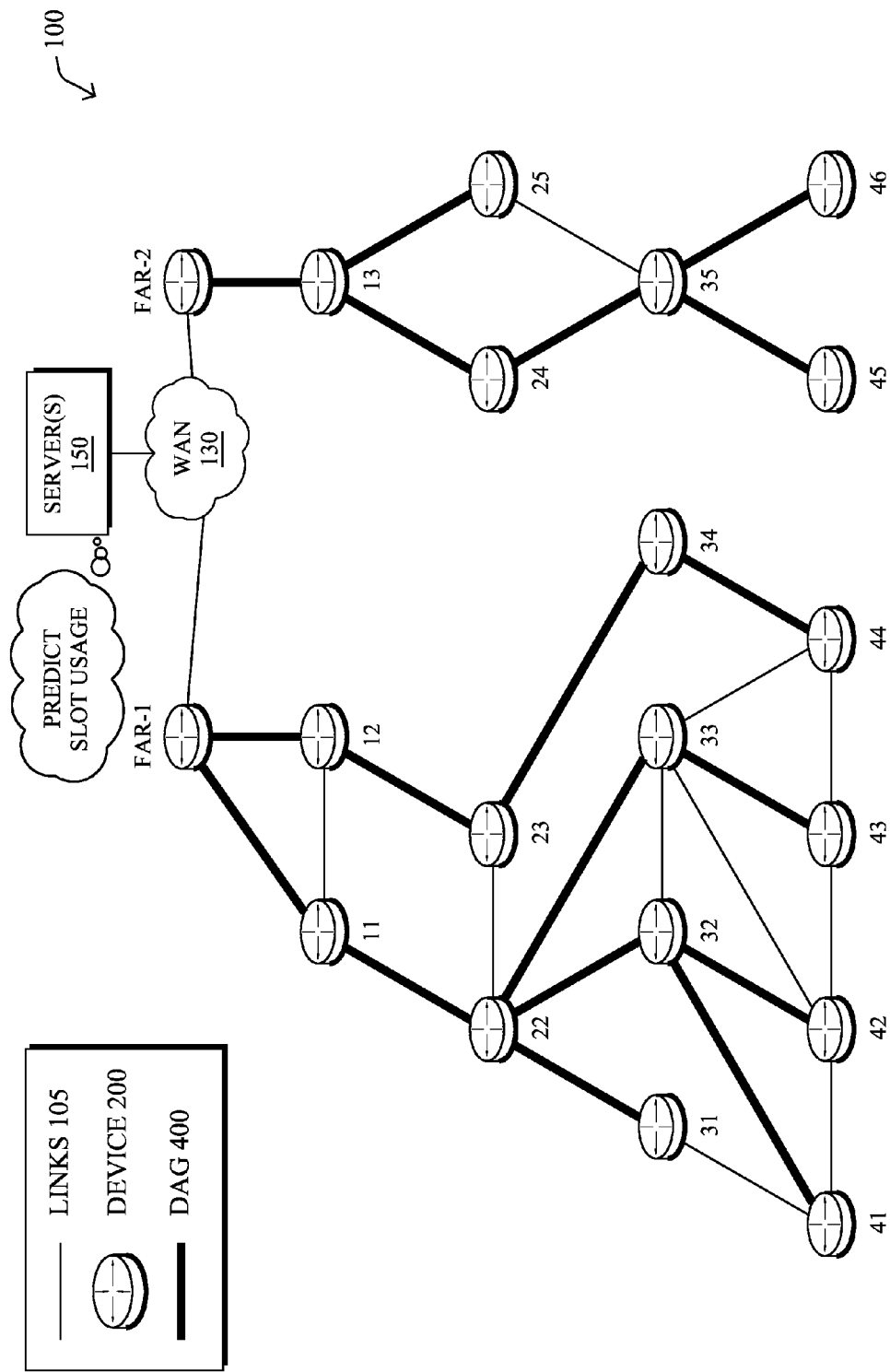
FIGS. 10A-E illustrate examples of time slot allocations being adjusted based on usage predictions.

FIGS. 10A-E illustrate examples of time slot allocations being adjusted based on usage predictions, according to various embodiments. In response to receiving the time slot usage reports, the prediction engine (e.g., a PCE in servers 150) may then perform predictions on the slot usage, as shown in FIG. 10A. In some implementations, the prediction engine may perform off-line background optimization of time slots in light of a prediction of all traffic between each node and their parent within a given collision domain. For example, if the prediction engine determines that in X hours the number of slots between node 42 and its parent node 32 will increase by x % while the traffic between node 41 and its parent node 32 will decrease by y %, the prediction engine may perform time slot arbitration accordingly (e.g., by reallocating some time slots from node 41 to node 42). Even in the absence of arbitration, if the prediction engine determines that the number of time slots needed between a pair of nodes is likely to increase over time or may be increased for a specific period of time (e.g., for two hours, on each Friday between 4 PM and 5 PM, etc.), the prediction engine may thus be able to anticipate time-based scheduling.

Figure 10B:
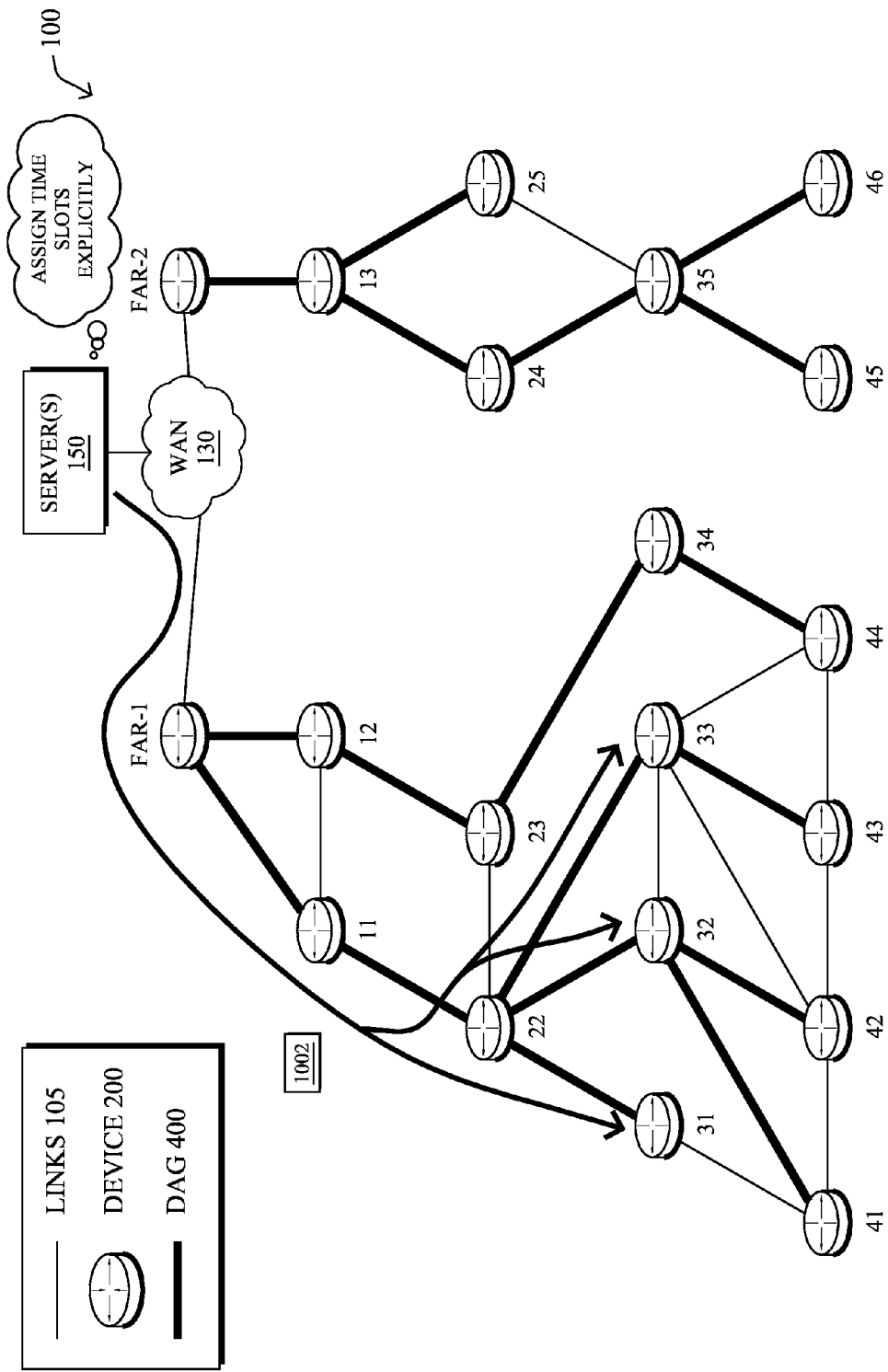

In all cases, two different modes of operation may be used to adjust the time schedules of the network nodes. In a first mode of operation, the PTS explicitly allocates new time slots to the various nodes in the network according to its prediction and using the existing time schedule-based approach. In other words, the time schedules are uploaded similarly to the existing approach but instead of reacting to explicit request, it is the PTS/prediction engine that makes use of an unsolicited action of time slot provisioning according to its predictions. For example, as shown in FIG. 10B, the prediction engine may explicitly allocate new time slots to the various nodes via an instruction 1002.

Figure 10C:
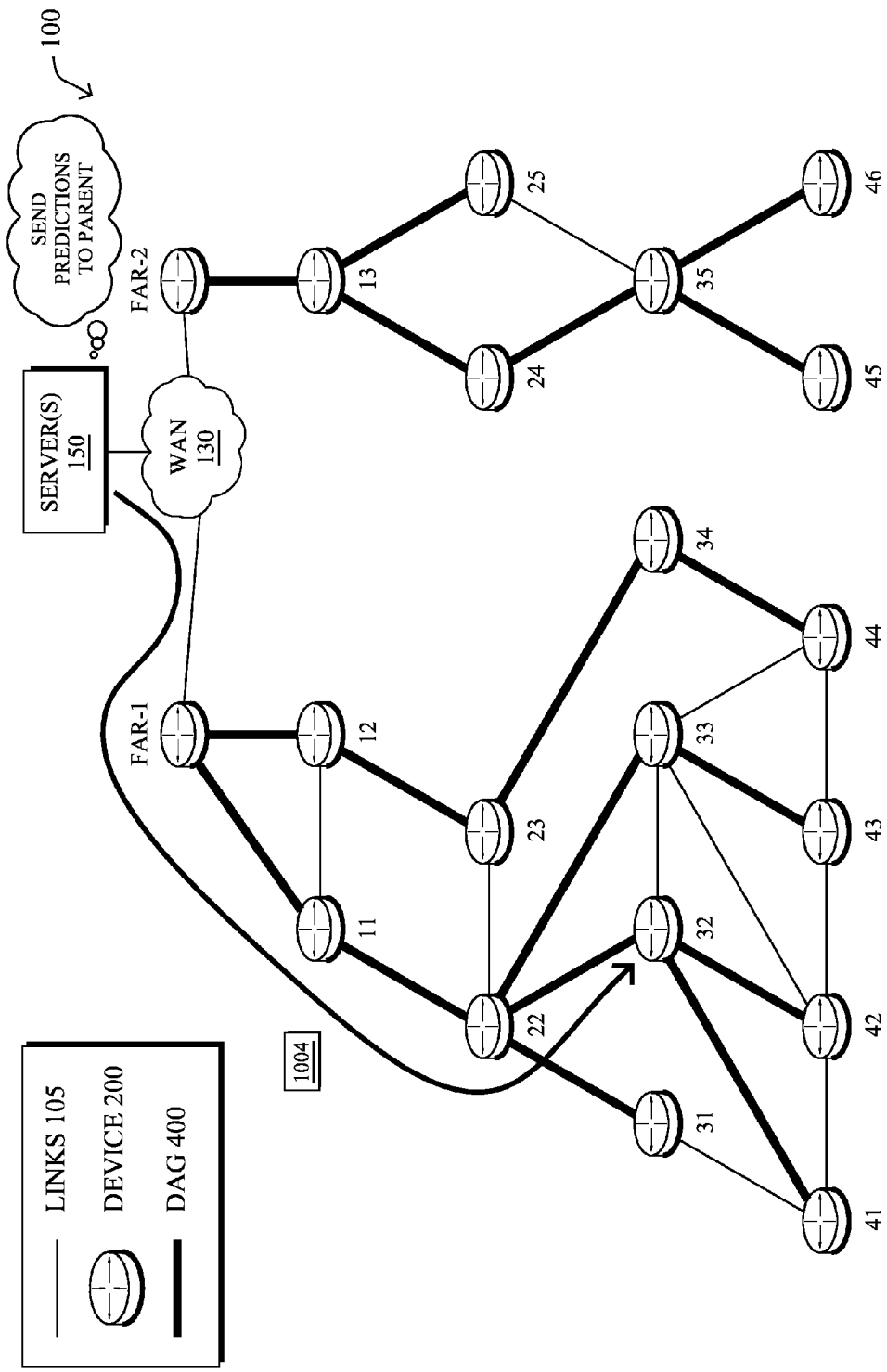
Figure 10D:
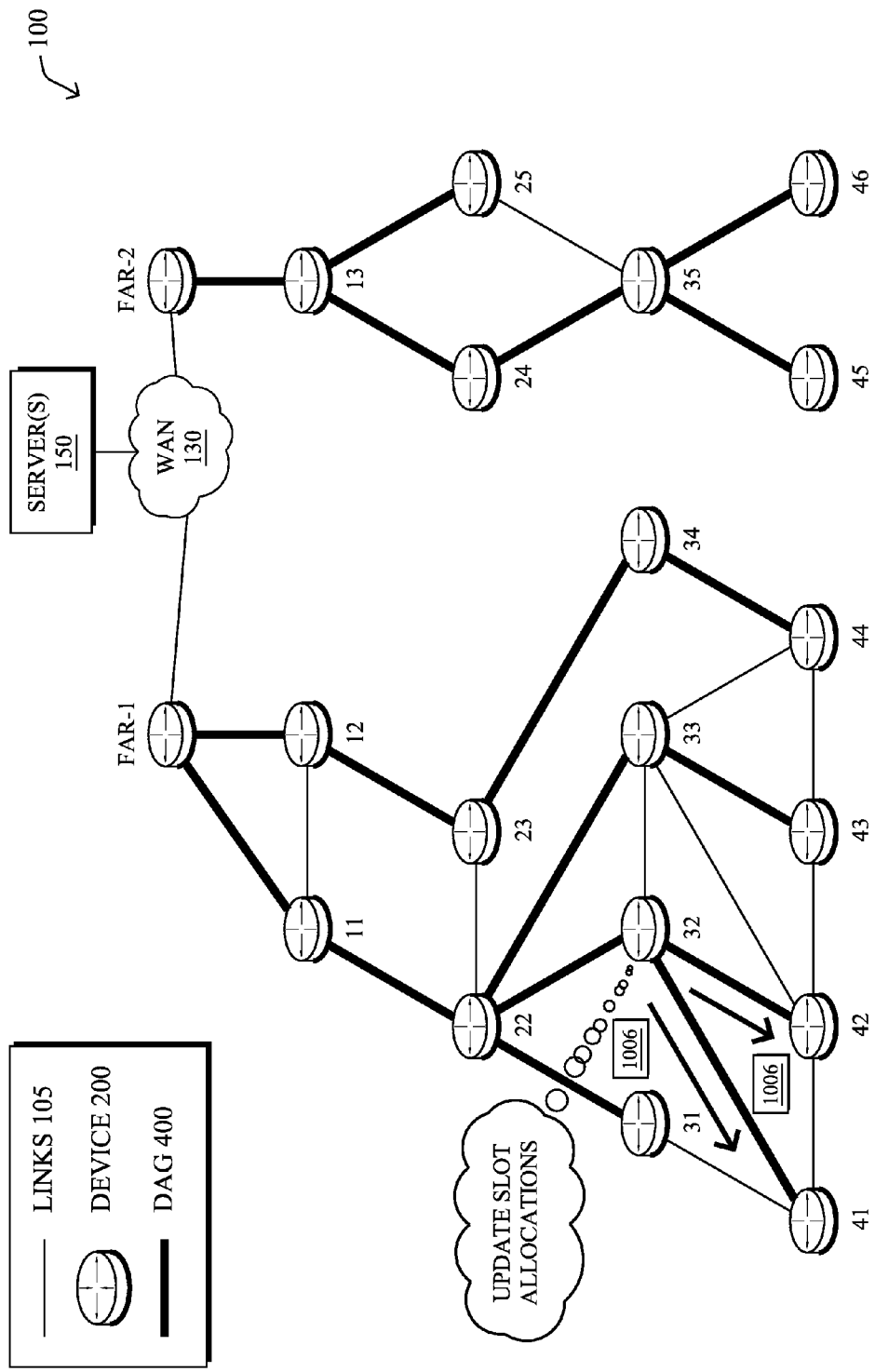

In another mode of operation, individual nodes may plan the communication schedule changes. In this mode, a node may be allowed to push a set of time-based schedules according to the predictions made by the prediction engine. For example, as shown in FIG. 10C, the PTS may send a message 1004 to node 32. Message 1004 may indicate to node 32 the state of a time frame and its upcoming changes at times T1, T2, etc., without the prediction engine having to resend the schedule. If the PTS predicts a traffic burst at T2−x milliseconds, it would then send the time frame while mentioning the values of the time frame at T2, with x being the time to allocate more time slots between the node and its parents. In response, node 32 may send instructions 1006 to its child nodes, to update their time slot allocations. Thus, the time slot assignment updates may be implemented prior to the predicted burst of traffic.

Figure 10E:
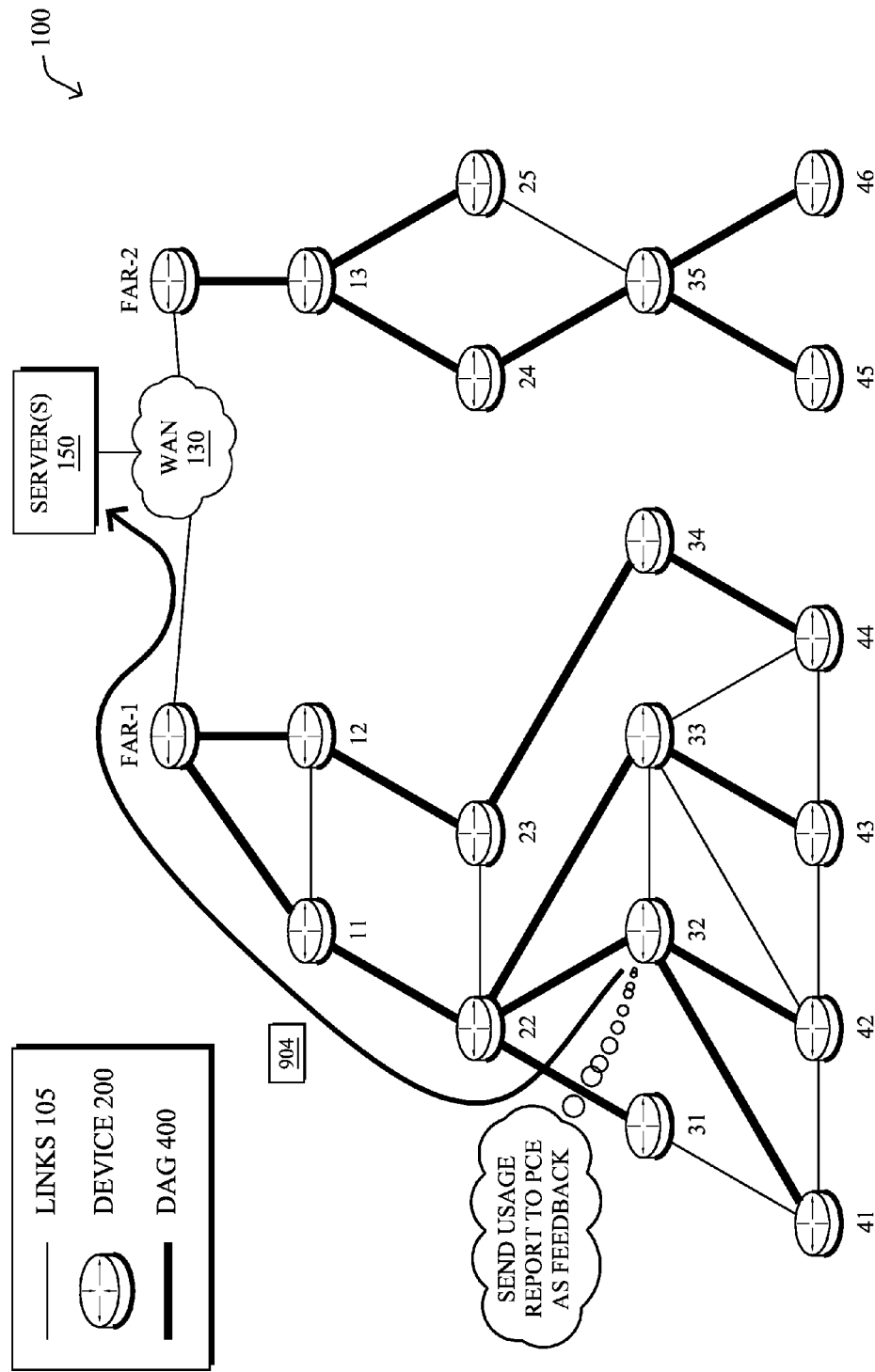

In some cases, a closed-loop mechanism may be implemented between the prediction engine and the nodes, as shown in FIG. 10E. In particular, the prediction engine may receive usage reports 904 from the nodes after a predicted change, to determine how accurate the prediction was. Indeed, if the prediction engine increases or decreases the time slot allocations between a pair of nodes based on a predicted traffic change, the prediction engine may monitor how accurate the prediction was and send further allocation changes as needed. For example, the prediction engine may adjust the periodic timer T used by the affected nodes, to increase the frequency of the time slot usage reports sent by the nodes to the prediction engine.

Figure 11:
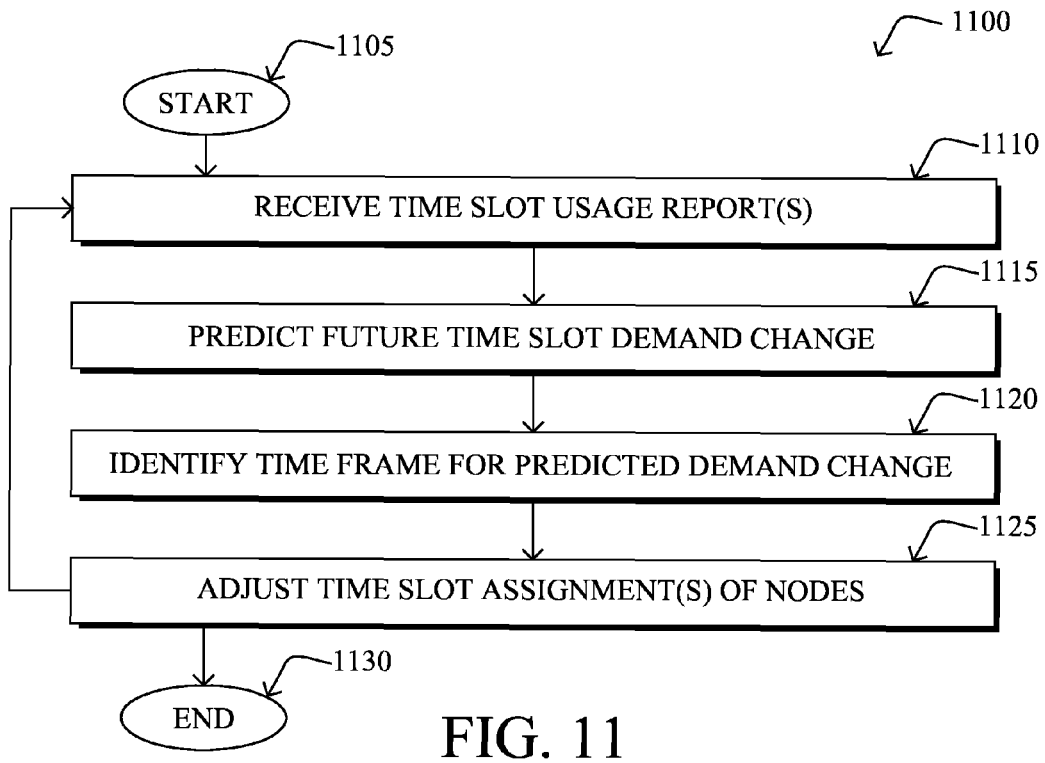
FIG. 11 illustrates an example simplified procedure for predictively adjusting time slot assignment.

FIG. 11 illustrates an example simplified procedure for predictively adjusting time slot assignment in accordance with one or more embodiments described herein. Procedure 1100 may be implemented, for example, by a prediction engine/centralized networking device, such as a PCE. Notably, the device may be centralized in the sense that it may oversee the operation of other network devices and may not be 'centralized' from a geographical standpoint. The procedure 1100 may start at step 1105, and continues to step 1110, where, as described in greater detail above, time slot usage reports may be received by the device. For example, a time slot usage report may indicate which cells of a CDU matrix (e.g., timeslots and associated channels) were used by a network node. In some cases, a time slot usage report may be received from a parent node in the network that monitors the usage of time slots allocated to its child nodes. In one embodiment, a time slot usage report may also be based on a notification sent by a child node that indicates that the child node has experienced a queuing delay.

At step 1115, as described in greater detail above, a time slot demand change for a particular node is predicted based on the one or more time slot usage reports. According to various embodiments, the time slot usage reports received in step 1110 may be used as input to a machine learning predictive model. Example models may include, but are not limited to, ARMA models, ARMA-X models, HMMs, Gaussian Processes, or any other machine learning model that can be used to predict traffic demand changes and/or the seasonality of such changes. For example, the device may predict that a particular node will generate a spike in network traffic and corresponding demand for TSCH time slots during a specific time of day. Such a predicted demand change may also be predicted to be periodic, based on previous time slot usage.

At step 1120, a time frame associated with the predicted time slot demand change may be identified, as described in greater detail above. For example, an increase or decrease in time slot demand by a particular node may be predicted to begin at a specific point in time and last for a predicted duration. In some cases, the time frame may also be open ended. For example, a time frame may indicate a start time associated with the change in time slot demand, but not have a corresponding end time (e.g., the change is predicted to be permanent).

At step 1125, one or more time slot assignments for the node(s) predicted to experience a time slot demand change may be adjusted based on the predicted time slot demand change and associated time frame. For example, if a particular node is predicted to need more time slot allocations than are currently allocated, it may be allocated extra time slots either preemptively or at a time associated with the predicted demand change. In one embodiment, the time slot assignments may be made explicitly by the device to the node(s). In another embodiment, the time slot adjustments may be provided to a parent node of the node(s). For example, the centralized device may notify the parent node of the predicted time slot demand change and associated time period, thereby causing the parent to generate an updated time slot assignment for the node(s) to use during the time period. Procedure 1100 then ends at a step 1130. In some embodiments, procedure may be repeated any number of times as part of a closed-loop mechanism whereby the central device receives feedback regarding the time slot adjustment and makes further adjustments as needed.

Figure 12:
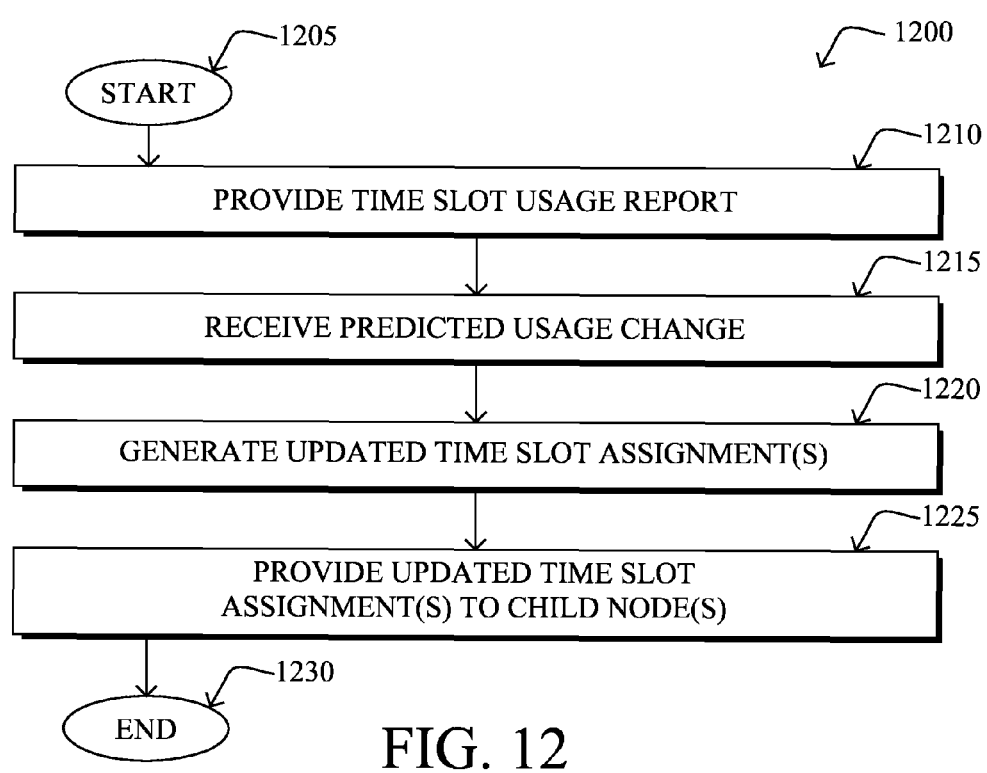
FIG. 12 illustrates an example simplified procedure for adjusting time slot assignments of one or more child nodes.

FIG. 12 illustrates an example simplified procedure for adjusting time slot assignments of one or more child nodes in accordance with one or more embodiments described herein. Procedure 1200 may be implemented, for example, by a network device/node. The procedure 1200 may start at step 1205, and continues to step 1210, where, as described in greater detail above, a time slot usage report may be provided to a prediction engine (e.g., a centralized network device). The usage report may be generated, for example, by monitoring the use of TSCH time slots assigned to the one or more child nodes of the device. In one embodiment, the time slot usage reports may also be based on notifications received by the child node(s) regarding any queuing delays experienced by a child node.

At step 1215, as described in greater detail above, a predicted time slot usage change for the one or more child nodes is received from the prediction engine. The change may indicate, for example, that a given child node is predicted to need more or less time slots (e.g., an amount of time slots) during a specified time period. For example, the received change may indicate that the child node is predicted to need additional time slots beginning at a specific point in time.

At step 1220, updated time slot assignments(s) are generated for the one or more child nodes, as detailed above, based on the predicted time slot usage change. For example, based on a prediction that a child node will need additional time slots starting at a certain point in time, the parent node may increase the number of time slot assignments to the child node either at the point in time or before the point in time (e.g., proactively). In one embodiment, arbitration may be performed among child nodes such that time slots are reassigned from one node predicted to have fewer demands to a child node predicted to experience an influx of traffic.

At step 1225, the updated time slot assignment(s) are provided to the child node(s), as described in greater detail above. For example, the parent node that owns a chunk of the overall TSCH schedule may reallocate time slot assignments to its child node(s). In one embodiment, the assignment(s) may be provided at a time that also takes into account the delay associated with the reassignment. For example, if a time slot demand change is predicted to occur at a time T2 for a child node, the corresponding update to the time slot assignments of the child node may be initiated prior to time T2, to account for the reassignment process. Procedure 1200 then ends at step 1230.

Figure 13:
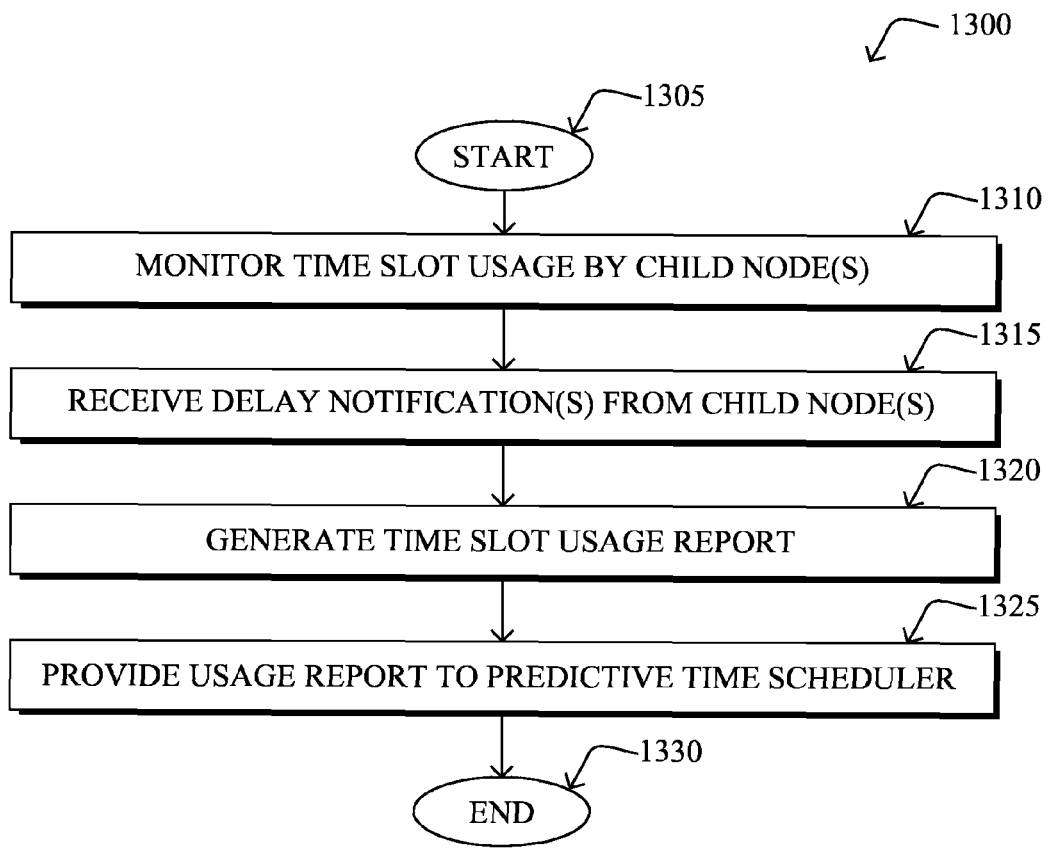
FIG. 13 illustrates an example simplified procedure for generating a time slot usage report.

FIG. 13 illustrates an example simplified procedure for generating a time slot usage report in accordance with one or more embodiments described herein. Procedure 1300 may be implemented, for example, by a parent network device/node of one or more child node(s) in the network. The procedure 1300 may start at step 1305, and continues to step 1310, where, as described in greater detail above, the parent node may monitor time slot usage by its one or more child nodes. For example, the parent node may determine whether or not a child node uses an assigned TSCH time slot to communicate with the parent node.

At step 1315, delay notification(s) are received from the one or more child nodes, as described in greater detail above. As noted previously, a parent node may not be able to determine whether a child node is experiencing queuing delays by simply observing the time slots used by the child node. In some embodiments, the child node may send a notification to the parent node that indicates that the child node has delayed sending some traffic until another time slot. The notification may also indicate a traffic priority for the queued traffic, which may be used as part of the decision to adjust the time slots allocated to the child node. For example, queuing delays associated with high priority traffic may be a greater indicator that more time slots should be allocated to the child node, whereas queuing delays with low priority traffic may be more acceptable.

At step 1320, a time slot usage report is generated, as described in greater detail above. As noted above, such a report may include information regarding the time slot usage by the child node(s), as well as any delays reported by the child node(s). For example, such a report may indicate that a particular child node is using all of its allocated time slots, but is still experiencing queuing delays, thereby indicating that the child node may need additional time slots.

At step 1325, as detailed above, the generated time slot usage report may be provided to a predictive time scheduler. For example, the usage report may be provided to a PTS executed by a centralized networking device, such as a PCE, NMS, etc. In response, the PTS may use the reports to predict future time slot demands for the network nodes and proactively initiate changes to their time slot assignments. Procedure 1300 then ends at step 1330.

It should be noted that while certain steps within procedures 1100-1300 may be optional as described above, the steps shown in FIGS. 11-13 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1100-1300 are described separately, certain steps from each procedure may be incorporated into each other procedure, and the procedures are not meant to be mutually exclusive.

The techniques described herein, therefore, provide for an architecture that may dramatically increase the scalability of time-based scheduling approaches in TSCH networks. The techniques herein may also improve the quality of service (QoS) of real-time flows since predicted traffic increases or decrease, and potentially the seasonality of such changes, may be used to proactively adjust the time slot allocations of the network nodes. Furthermore, since the time slot allocations can be proactively initiated, the heavy computations associated with the predictions may be performed in the background instead of being triggered reactively (e.g., based on real-time reporting of network conditions). In addition, the techniques herein may considerably reduce the overhead of the control plane, which may be of utmost importance in constrained networks, such as LLNs implementing TSCH.

While there have been shown and described illustrative embodiments that provide for the arbitration of time contention in a shared-media communication network, it is to be understood that various other adaptations and modifications may be made within the spirit and scope of the embodiments herein. For example, the embodiments have been shown and described herein primarily with respect to LLNs. However, the embodiments in their broader sense are not as limited, and may, in fact, be used with other types of networks and/or protocols (e.g., wireless). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a device in a network, one or more time slot usage reports regarding a use of time slots of a channel hopping schedule by nodes in the network;
   predicting, via a learning machine model hosted on the device, a burst of traffic for a particular node based on the one or more time slot usage reports;
   predicting, via the learning machine model hosted on the device, a time slot demand change for the particular node based on the predicted burst of traffic by detecting time-based patterns in the one or more time slot usage reports;
   identifying, by the device, a time frame associated with the predicted time slot demand change; and
   prior to the predicted burst of traffic, adjusting, by the device, a time slot assignment for the particular node in the channel hopping schedule based on the predicted demand change and the identified time frame associated with the predicted time slot demand change.

2. The method as in claim 1, further comprising:
   receiving, at the device, feedback regarding the adjusted time slot assignment; and
   in response to receiving the feedback, readjusting the time slot assignment based on the received feedback.

3. The method as in claim 1, wherein adjusting the time slot assignment comprises:
   instructing the particular node to use a specified set of time slots for communication.

4. The method as in claim 1, wherein adjusting the time slot assignment comprises:
   notifying a parent of the particular node of the predicted time slot demand change and associated time period, wherein the parent generates an updated time slot assignment for the particular node to use during the time period.

5. The method as in claim 1, wherein the one or more time slot usage reports are received from a parent node of the particular node, wherein the parent node monitors time slot usage by the particular node.

6. The method as in claim 1, wherein the one or more time slot usage reports are based on a notification from the particular node that the particular node has experienced a queuing delay.

7. A method, comprising:
   providing, by a network node, one or more time slot usage reports to a time slot usage prediction engine regarding a use of time slots of a channel hopping schedule by one or more child nodes of the network node, the prediction engine hosting a learning machine model;
   receiving, at the network node, a predicted time slot usage change from the prediction engine based on a predicted burst of traffic for the one or more child nodes, the predicted burst of traffic based on detection of time-based patterns in the one or more time slot usage reports;
   generating, by the network node, one or more updated time slot assignments for the one or more child nodes based on the predicted time slot usage change; and
   providing, by the network node, the one or more updated time slot assignments to the one or more child nodes prior to the predicted burst of traffic.

8. The method as in claim 7, wherein providing the one or more time slot usage reports comprises:
   monitoring, by the network node, time slot usage of a channel hopping schedule by the one or more child nodes;
   generating, by the network node, an aggregated time slot usage report based on the monitored time slot usage; and
   providing the aggregated time slot usage report to the time slot usage prediction engine.

9. The method as in claim 8, further comprising:
   receiving, at the network node, a notification that a particular child node has delayed traffic due to the particular child node not having sufficient time slot allocations.

10. The method as in claim 7, wherein a time slot usage report is provided after expiration of a timer.

11. The method as in claim 7, wherein the predicted time slot usage change is associated with a time period.

12. The method as in claim 11, further comprising:
    providing an updated time slot assignment to a particular child node for use during the time period; and after expiration of the time period, reverting the particular child node to a previously used time slot assignment.

13. An apparatus, comprising:
one or more network interfaces to communicate with a network;
a processor coupled to the network interfaces and configured to execute one or more processes; and
a memory configured to store a process executable by the processor, the process when executed operable to:
receive one or more time slot usage reports regarding a use of time slots of a channel hopping schedule by nodes in the network;
predict, via a learning machine model, a burst of traffic for a particular node based on the one or more time slot usage reports;
predict, via the learning machine model, a time slot demand change for the particular node based on the predicted burst of traffic by detecting time-based patterns in the one or more time slot usage reports;
identify a time frame associated with the predicted time slot demand change; and
prior to the predicted burst of traffic, adjust a time slot assignment for the particular node in the channel hopping schedule based on the predicted demand change and the identified time frame associated with the predicted time slot demand change.

14. The apparatus as in claim 13, wherein the process when executed is further operable to:
receive feedback regarding the adjusted time slot assignment; and
in response to receiving the feedback, readjust the time slot assignment based on the received feedback.

15. The apparatus as in claim 13, the time slot assignment is adjusted by:
instructing the particular node to use a specified set of time slots for communication.

16. The apparatus as in claim 13, wherein the time slot assignment is adjusted by:
notifying a parent of the particular node of the predicted time slot demand change and associated time period, wherein the parent generates an updated time slot assignment for the particular node to use during the time period.

17. The apparatus as in claim 13, wherein the one or more time slot usage reports are received from a parent node of the particular node, wherein the parent node monitors time slot usage by the particular node.

18. The apparatus as in claim 13, wherein the one or more time slot usage reports are based on a notification from the particular node that the particular node has experienced a queuing delay.

19. An apparatus, comprising:
one or more network interfaces to communicate with a network;
a processor coupled to the network interfaces and configured to execute one or more processes; and
a memory configured to store a process executable by the processor, the process when executed operable to:
provide one or more time slot usage reports to a time slot usage prediction engine regarding a use of time slots of a channel hopping schedule by one or more child nodes of the network node, the prediction engine hosting a learning machine model;
receive a predicted time slot usage change from the prediction engine based on a predicted burst of traffic for the one or more child nodes, the predicted burst of traffic based on detection of time-based patterns in the one or more time slot usage reports;
generate one or more updated time slot assignments for the one or more child nodes based on the predicted time slot usage change; and
provide the one or more updated time slot assignments to the one or more child nodes prior to the predicted burst of traffic.

20. The apparatus as in claim 19, wherein the process when executed is further operable to:
monitor time slot usage of a channel hopping schedule by the one or more child nodes;
generate an aggregated time slot usage report based on the monitored time slot usage; and
provide the aggregated time slot usage report to the time slot usage prediction engine.

21. The apparatus as in claim 20, wherein the process when executed is further operable to:
receive a notification that a particular child node has delayed traffic due to the particular child node not having sufficient time slot allocations.

22. The apparatus as in claim 19, wherein a time slot usage report is provided after expiration of a timer.

23. The apparatus as in claim 19, wherein the predicted time slot usage change is associated with a time period.

24. The apparatus as in claim 23, wherein the process when executed is further operable to:
providing an updated time slot assignment to a particular child node for use during the time period; and
after expiration of the time period, reverting the particular child node to a previously used time slot assignment.

25. A tangible, non-transitory, computer-readable media having software encoded thereon, the software when executed by a processor operable to:
receive one or more time slot usage reports regarding a use of time slots of a channel hopping schedule by nodes in the network;
predict, via a learning machine model, a burst of traffic for a particular node based on the one or more time slot usage reports;
predict, via a learning machine model, a time slot demand change for the particular node based on the predicted burst of traffic by detecting time-based patterns in the one or more time slot usage reports;
identify a time frame associated with the predicted time slot demand change; and
prior to the predicted burst of traffic, adjust a time slot assignment for the particular node in the channel hopping schedule based on the predicted demand change and the identified time frame associated with the predicted time slot demand change.

26. A tangible, non-transitory, computer-readable media having software encoded thereon, the software when executed by a processor operable to:
provide one or more time slot usage reports to a time slot usage prediction engine regarding a use of time slots of a channel hopping schedule by one or more child nodes of the network node, the prediction engine hosting a learning machine model;
receive a predicted time slot usage change from the prediction engine based on a predicted burst of traffic for the one or more child nodes, the predicted burst of traffic based on detection of time-based patterns in the one or more time slot usage reports;
generate one or more updated time slot assignments for the one or more child nodes based on the predicted time slot usage change; and provide the one or more updated time slot assignments to the one or more child nodes prior to the predicted burst of traffic.

\* \* \* \* \*